US009066066B2

(12) United States Patent
Ellis

(10) Patent No.: US 9,066,066 B2
(45) Date of Patent: *Jun. 23, 2015

(54) INTERACTIVE TELEVISION SYSTEMS WITH CONFLICT MANAGEMENT CAPABILITIES

(71) Applicant: Rovi Guides, Inc., Santa Clara, CA (US)

(72) Inventor: Michael D. Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/014,709

(22) Filed: Aug. 30, 2013

(65) Prior Publication Data
US 2013/0343730 A1   Dec. 26, 2013

Related U.S. Application Data

(63) Continuation of application No. 12/621,077, filed on Nov. 18, 2009, now Pat. No. 8,549,563, which is a continuation of application No. 10/306,175, filed on Nov. 25, 2002, now abandoned.

(51) Int. Cl.
*H04N 5/445* (2011.01)
*H04N 5/76* (2006.01)
(Continued)

(52) U.S. Cl.
CPC . *H04N 5/93* (2013.01); *H04N 5/76* (2013.01); *H04N 5/44543* (2013.01); *H04N 5/782* (2013.01); *H04N 21/42204* (2013.01); *H04N 21/4312* (2013.01); *H04N 21/4314* (2013.01);
(Continued)

(58) Field of Classification Search
CPC ............ H04N 21/433; H04N 21/4334; H04N 21/458; H04N 21/4583; H04N 21/472; H04N 21/47214; H04N 21/47217; H04N 5/76

USPC .................................... 725/58; 386/291, 292
See application file for complete search history.

(56) References Cited

U.S. PATENT DOCUMENTS 4,264,924 A   4/1981   Freeman
4,264,925 A   4/1981   Freeman et al.
(Continued)

FOREIGN PATENT DOCUMENTS

EP   0 682 452   11/1995
EP   0753964   1/1997
(Continued)

*Primary Examiner* — James R Sheleheda
(74) *Attorney, Agent, or Firm* — Ropes & Gray LLP

(57) ABSTRACT

An interactive television system is provided in which a user can use an interactive television application to establish time-based settings. The user may set television program reminders, advance-order pay-per-view programs, schedule programs for recording, and establish parental controls to prevent television viewing during certain times on certain channels. The interactive television application may be used to support video recorder functions such as personal video recorder functions implemented locally on the user's set-top box or other equipment and network-based video recorder functions implemented using servers at cable television headends and other network locations. The interactive television application may also be used to deliver video-on-demand content. When the user requests that video be delivered, conflicts may arise between the requested video delivery and the previously-established time-based settings. The interactive television application may provide the user with on-screen options that allow the user to select how to resolve these conflicts.

20 Claims, 30 Drawing Sheets

(51) Int. Cl.
  *H04N 5/93*     (2006.01)
  *H04N 5/782*    (2006.01)
  *H04N 21/431*   (2011.01)
  *H04N 21/433*   (2011.01)
  *H04N 21/45*    (2011.01)
  *H04N 21/462*   (2011.01)
  *H04N 21/472*   (2011.01)
  *H04N 21/475*   (2011.01)
  *H04N 21/482*   (2011.01)
  *H04N 21/422*   (2011.01)
  *H04N 21/47*    (2011.01)

(52) U.S. Cl.
  CPC ....... *H04N 21/4316* (2013.01); *H04N 21/4334* (2013.01); *H04N 21/4532* (2013.01); *H04N 21/4622* (2013.01); *H04N 21/47* (2013.01); *H04N 21/472* (2013.01); *H04N 21/47202* (2013.01); *H04N 21/47214* (2013.01); *H04N 21/4755* (2013.01); *H04N 21/482* (2013.01)

(56) References Cited

U.S. PATENT DOCUMENTS

| | | |
|---|---|---|
| 4,573,072 A | 2/1986 | Freeman |
| 4,706,121 A | 11/1987 | Young |
| 4,908,707 A | 3/1990 | Kinghorn |
| 4,945,563 A | 7/1990 | Horton et al. |
| 4,977,455 A | 12/1990 | Young |
| 5,038,211 A | 8/1991 | Hallenbeck |
| 5,047,867 A | 9/1991 | Strubbe et al. |
| 5,068,733 A | 11/1991 | Bennett |
| 5,151,789 A | 9/1992 | Young |
| 5,187,589 A | 2/1993 | Kono et al. |
| 5,195,134 A | 3/1993 | Inoue et al. |
| 5,210,611 A | 5/1993 | Yee et al. |
| 5,223,924 A | 6/1993 | Strubbe |
| RE34,340 E | 8/1993 | Freeman |
| 5,253,066 A | 10/1993 | Vogel |
| 5,285,284 A | 2/1994 | Takashima et al. |
| 5,296,931 A | 3/1994 | Na |
| 5,323,234 A | 6/1994 | Kawasaki |
| 5,410,344 A | 4/1995 | Graves et al. |
| 5,416,508 A | 5/1995 | Sakuma et al. |
| 5,479,266 A | 12/1995 | Young et al. |
| 5,479,268 A | 12/1995 | Young et al. |
| 5,485,219 A | 1/1996 | Woo |
| 5,532,754 A | 7/1996 | Young et al. |
| 5,534,911 A | 7/1996 | Levitan |
| 5,539,822 A | 7/1996 | Lett |
| 5,550,576 A | 8/1996 | Klosterman |
| 5,568,272 A | 10/1996 | Levine |
| 5,576,755 A | 11/1996 | Davis et al. |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,619,274 A | 4/1997 | Roop et al. |
| 5,629,733 A | 5/1997 | Youman et al. |
| 5,631,995 A | 5/1997 | Weissensteiner et al. |
| 5,632,007 A | 5/1997 | Freeman |
| 5,657,414 A | 8/1997 | Lett et al. |
| 5,684,525 A | 11/1997 | Klosterman |
| 5,694,381 A | 12/1997 | Sako |
| 5,699,107 A | 12/1997 | Lawler et al. |
| 5,721,829 A * | 2/1998 | Dunn et al. ............... 725/87 |
| 5,724,091 A | 3/1998 | Freeman et al. |
| 5,727,060 A | 3/1998 | Young |
| 5,758,257 A | 5/1998 | Herz et al. |
| 5,790,198 A | 8/1998 | Roop et al. |
| 5,801,787 A | 9/1998 | Schein et al. |
| 5,805,763 A | 9/1998 | Lawler et al. |
| 5,808,608 A | 9/1998 | Young et al. |
| 5,809,204 A | 9/1998 | Young et al. |
| 5,812,205 A | 9/1998 | Milnes et al. |
| 5,812,937 A | 9/1998 | Takahisa et al. |
| 5,828,945 A | 10/1998 | Klosterman |
| 5,850,218 A * | 12/1998 | LaJoie et al. ............... 725/45 |
| 5,940,572 A | 8/1999 | Balaban et al. |
| 5,969,748 A | 10/1999 | Casement et al. |
| 5,974,222 A | 10/1999 | Yuen et al. |
| 6,081,291 A | 6/2000 | Ludwig, Jr. |
| 6,091,883 A | 7/2000 | Artigalas et al. |
| 6,141,488 A | 10/2000 | Knudson et al. |
| 6,154,771 A | 11/2000 | Rangan et al. |
| 6,157,413 A | 12/2000 | Hanafee et al. |
| 6,177,931 B1 | 1/2001 | Alexander et al. |
| 6,185,360 B1 * | 2/2001 | Inoue et al. ............... 386/248 |
| 6,208,799 B1 * | 3/2001 | Marsh et al. ............... 386/292 |
| 6,233,389 B1 | 5/2001 | Barton et al. |
| 6,275,648 B1 | 8/2001 | Knudson et al. |
| 6,327,418 B1 | 12/2001 | Barton |
| 6,370,317 B2 | 4/2002 | Nagano et al. |
| 6,442,332 B1 | 8/2002 | Knudson et al. |
| 6,473,559 B1 | 10/2002 | Knudson et al. |
| 6,507,951 B1 * | 1/2003 | Wugofski ............... 725/59 |
| 6,681,396 B1 | 1/2004 | Bates et al. |
| 6,756,997 B1 | 6/2004 | Ward, III et al. |
| 6,771,886 B1 * | 8/2004 | Mendelsohn ............... 386/291 |
| 7,149,415 B2 | 12/2006 | Thiagarajan et al. |
| 7,293,276 B2 | 11/2007 | Phillips et al. |
| 2001/0004418 A1 | 6/2001 | Nagano et al. |
| 2002/0144279 A1 | 10/2002 | Zhou |
| 2003/0009766 A1 * | 1/2003 | Marolda ............... 725/97 |
| 2003/0126607 A1 | 7/2003 | Phillips et al. |
| 2004/0078817 A1 * | 4/2004 | Horowitz et al. ............... 725/58 |
| 2006/0179462 A1 * | 8/2006 | Willame et al. ............... 725/90 |
| 2009/0222875 A1 * | 9/2009 | Cheng et al. ............... 725/147 |

FOREIGN PATENT DOCUMENTS

| | | |
|---|---|---|
| EP | 0 836 320 | 4/1998 |
| EP | 0854645 A2 | 7/1998 |
| EP | 1187467 A2 | 3/2002 |
| GB | 2 229 595 | 9/1990 |
| JP | 10174037 A | 6/1998 |
| JP | 11-275472 | 10/1999 |
| JP | 2002-010149 A | 1/2002 |
| WO | WO-9222983 A2 | 12/1992 |
| WO | WO-93/23957 A1 | 11/1993 |
| WO | WO-96/26605 | 8/1996 |
| WO | WO-96/36172 | 11/1996 |
| WO | WO-96/37075 | 11/1996 |
| WO | WO-97/13368 | 4/1997 |
| WO | WO-99/52279 | 10/1999 |
| WO | WO-99/66725 | 12/1999 |
| WO | WO-00/04706 A2 | 1/2000 |
| WO | WO-00/07368 | 2/2000 |
| WO | WO-00/08852 | 2/2000 |
| WO | WO-00/16548 | 3/2000 |
| WO | WO-00/58833 | 10/2000 |
| WO | WO-00/58967 | 10/2000 |
| WO | WO-00/59223 | 10/2000 |
| WO | WO-00/67475 | 11/2000 |
| WO | WO-01/22729 | 3/2001 |
| WO | WO-01/76239 | 10/2001 |
| WO | WO-0182600 A2 | 11/2001 |
| WO | WO-0191460 A2 | 11/2001 |
| WO | WO-02069636 A1 | 9/2002 |

* cited by examiner

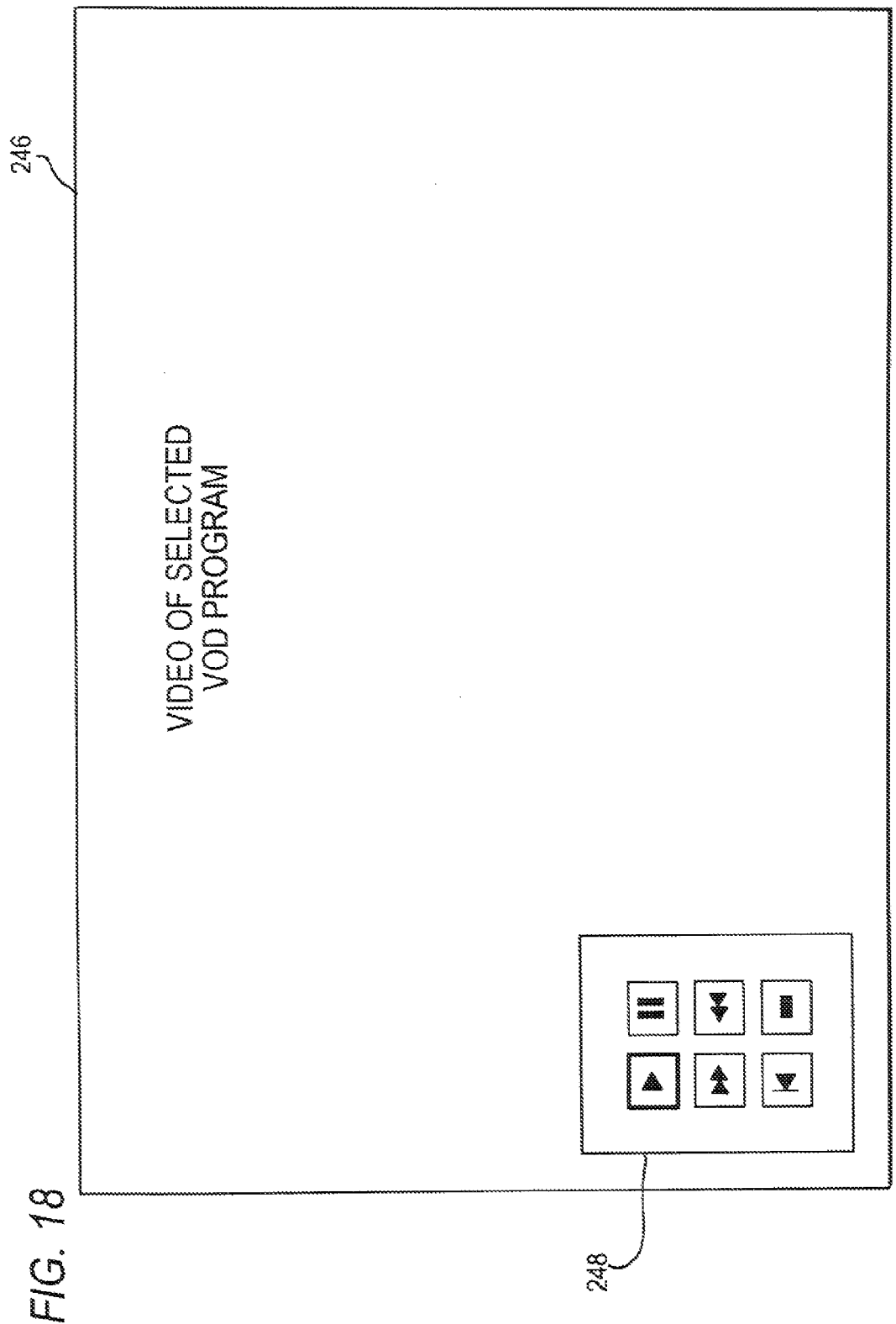

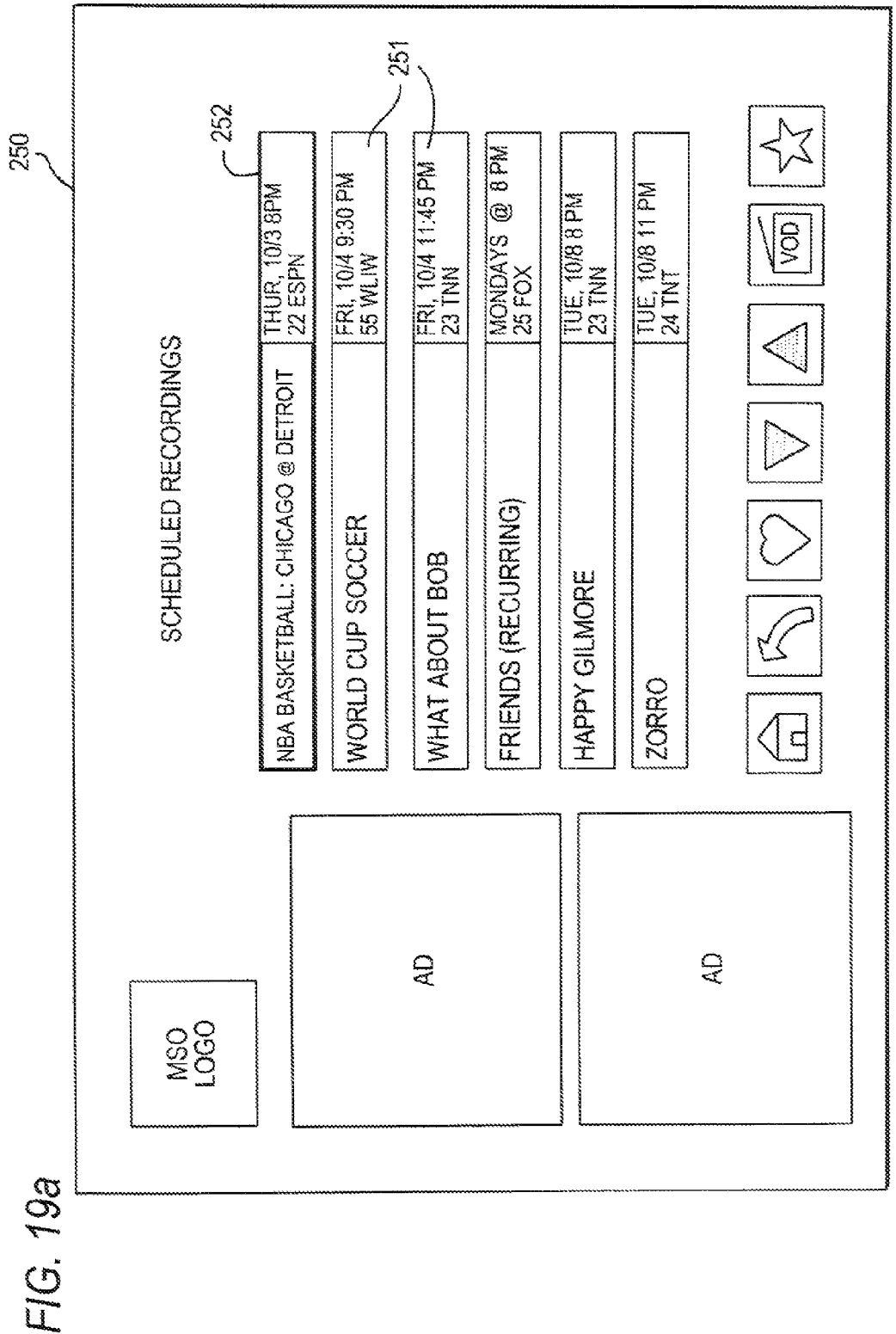

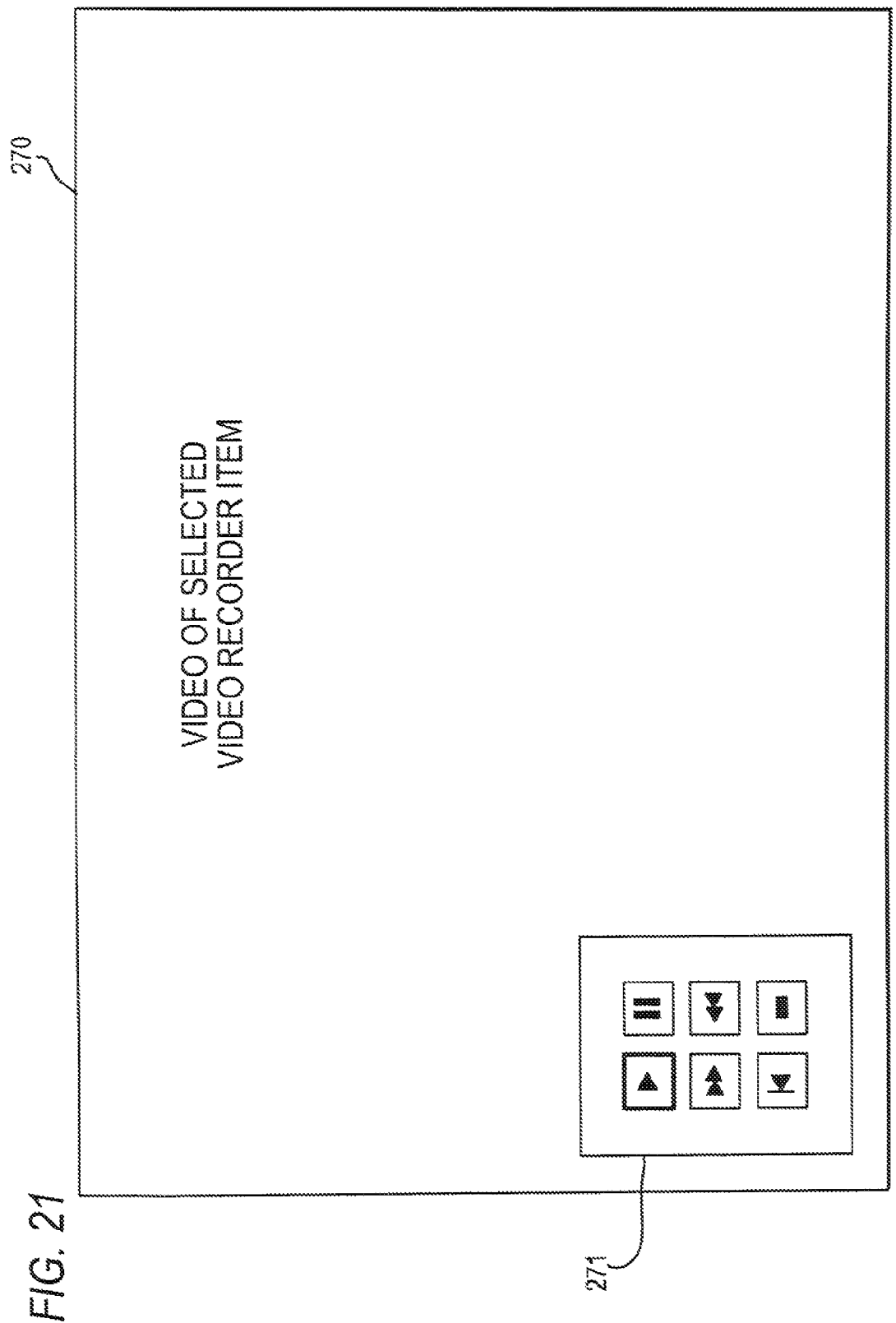

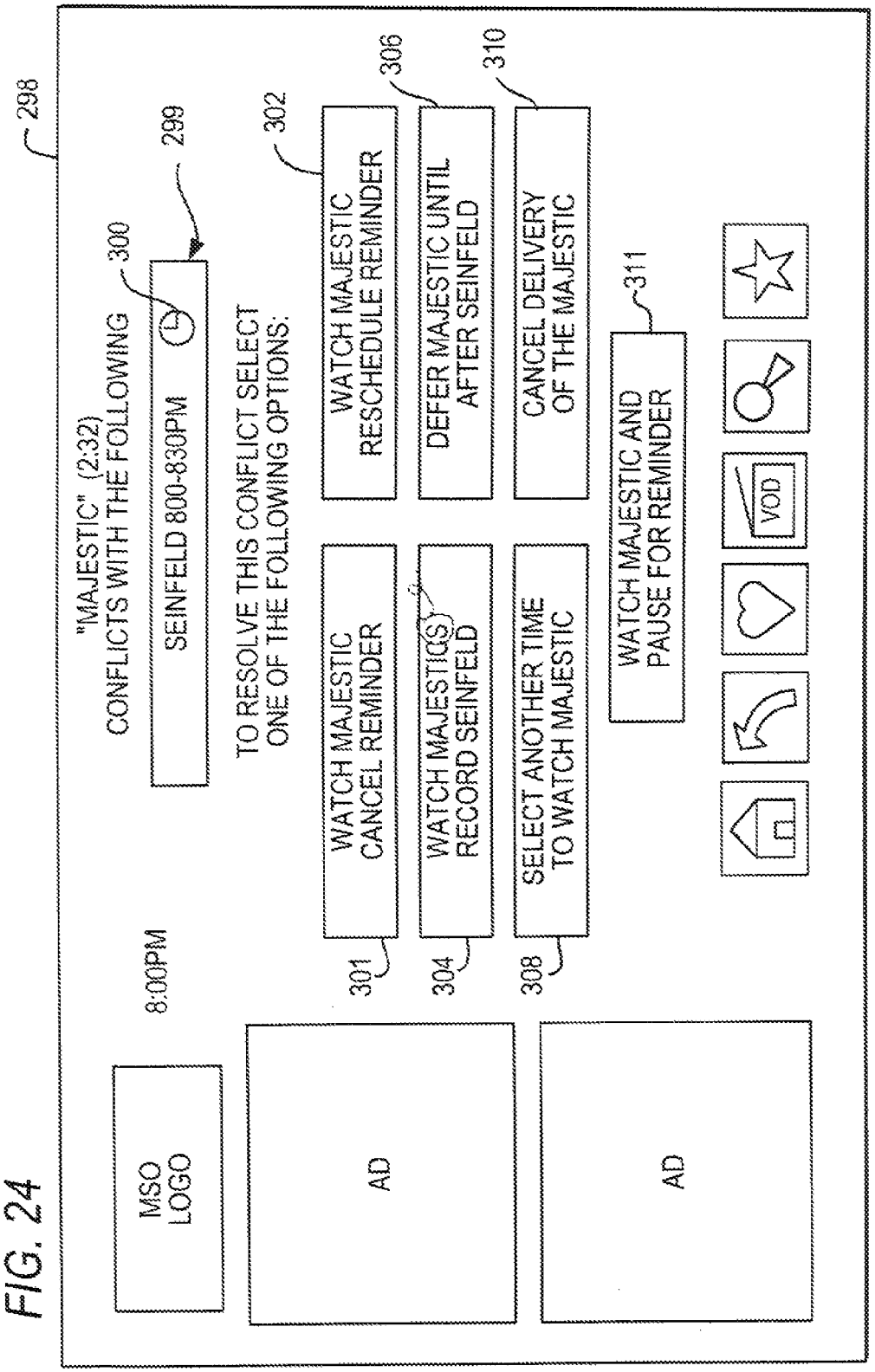

INTERACTIVE TELEVISION SYSTEMS WITH CONFLICT MANAGEMENT CAPABILITIES

CROSS REFERENCE TO RELATED APPLICATIONS

The application is a continuation of prior U.S. patent application Ser. No. 12/621,077, filed Nov. 18, 2009, titled 'Interactive Television Systems With Conflict Management Capabilities'; which is a continuation of U.S. patent application Ser. No. 10/306,175, filed Nov. 25, 2002 (now abandoned), all of which are hereby incorporated by reference herein in their entirety.

BACKGROUND OF THE INVENTION

This invention relates to television systems, and more particularly, to interactive television systems such as interactive television program guide systems with video-on-demand and video recorder capabilities.

Interactive television systems may be used to provide interactive television program guides in which screens of interactive television program listings are presented to users. Pay-per-view and video-on-demand services, web browsing services, games, home shopping, and other interactive features may be provided using interactive television systems.

In typical interactive television systems, users have set-top boxes or other equipment in their home with which the users interact using remote controls or other user interfaces. In a computer environment, users can access interactive television program guide web sites.

Interactive television program guides may be implemented on personal video recorder platforms. A typical personal video recorder has a hard disk drive for storing digital video recordings that may be played back on a user's television. Video recorder functionality may also be provided using equipment at a cable system headend. With this type of network-based video recorder, a user may direct equipment at the headend to perform video recording and playback functions.

The delivery of video-on-demand or video recorder content may give rise to conflicts. For example, the delivery of a video-on-demand movie may overlap with a program for which the user has set a reminder with an interactive television program guide. Conflicts may also arise between video delivery and scheduled recordings or time-based parental control settings.

SUMMARY OF THE INVENTION

In accordance with the present invention, interactive television systems are provided that help manage potential conflicts that arise when the requested delivery of video-on-demand or video recorder content might overlap with an existing time-based setting such as a scheduled reminder, a scheduled recording, a pre-ordered pay-per-view program or a time-based parental control setting. Interactive television functionality may be supported through the use of interactive television applications that are implemented on user equipment such as cable set-top boxes, personal video recorders, personal computers, satellite integrated receiver decoders (IRD) boxes, interactive televisions, or other suitable devices. The interactive television applications may be used to provide video recorder functions, video-on-demand functions, and program guide services. The user may set reminders for programs, may purchase pay-per-view programs, may establish times at which certain programs will be automatically recorded, and may use parental control functions to selectively block the viewing of content during certain time periods. The interactive television applications may display program listings and provide other services such as home shopping, banking, web browsing, games, etc.

Video-on-demand content and video recorder content may be stored at network locations outside of users' homes or other viewing locations. For example, a video server at a cable system headend or other suitable location in the distribution network of an interactive television system may be used to support video-on-demand and video recorder functions.

Network-based video recording may involve storing a virtual recording in the personal area assigned to a particular user. The user may use the interactive television application to access the personal area. For example, the user may use the interactive television application to direct the system to play back a desired program on the user's equipment. The user may also use the interactive television application to order or request video-on-demand content.

When the delivery of video associated with a video-on-demand order or the playback of a recording from a network-based video recorder or a personal video recorder in the user's home gives rise to a conflict with a previously-established time-based setting, the user may be provided with various options for resolving the conflict. For example, the user may be provided with an opportunity to reschedule delivery of video-on-demand content if the originally selected order time would cause the video-on-demand content to overlap with the airing of a program from which the user had previously established a reminder.

Further features of the invention, its nature and various advantages will be more apparent from the accompanying drawings and the following detailed description of the preferred embodiments.

BRIEF DESCRIPTION OF THE DRAWINGS

FIG. 18 is an illustrative display screen showing how video-on-demand playback controls may be displayed while video-on-demand content is being displayed for the user in accordance with the present invention.

FIGS. 19a and 19b are illustrative display screens showing how a user's scheduled recordings may be presented and selected in an interactive list in accordance with the present invention.

FIG. 21 is an illustrative display screen showing how video for a recording selected from the list of FIG. 18 may be displayed for the user in accordance with the present invention.

FIGS. 24-27 are illustrative conflict resolution display screens that may be displayed for the user when it is determined that a requested video delivery conflicts with a program reminder in accordance with the present invention.

DETAILED DESCRIPTION OF THE PREFERRED EMBODIMENTS

Figure 1:
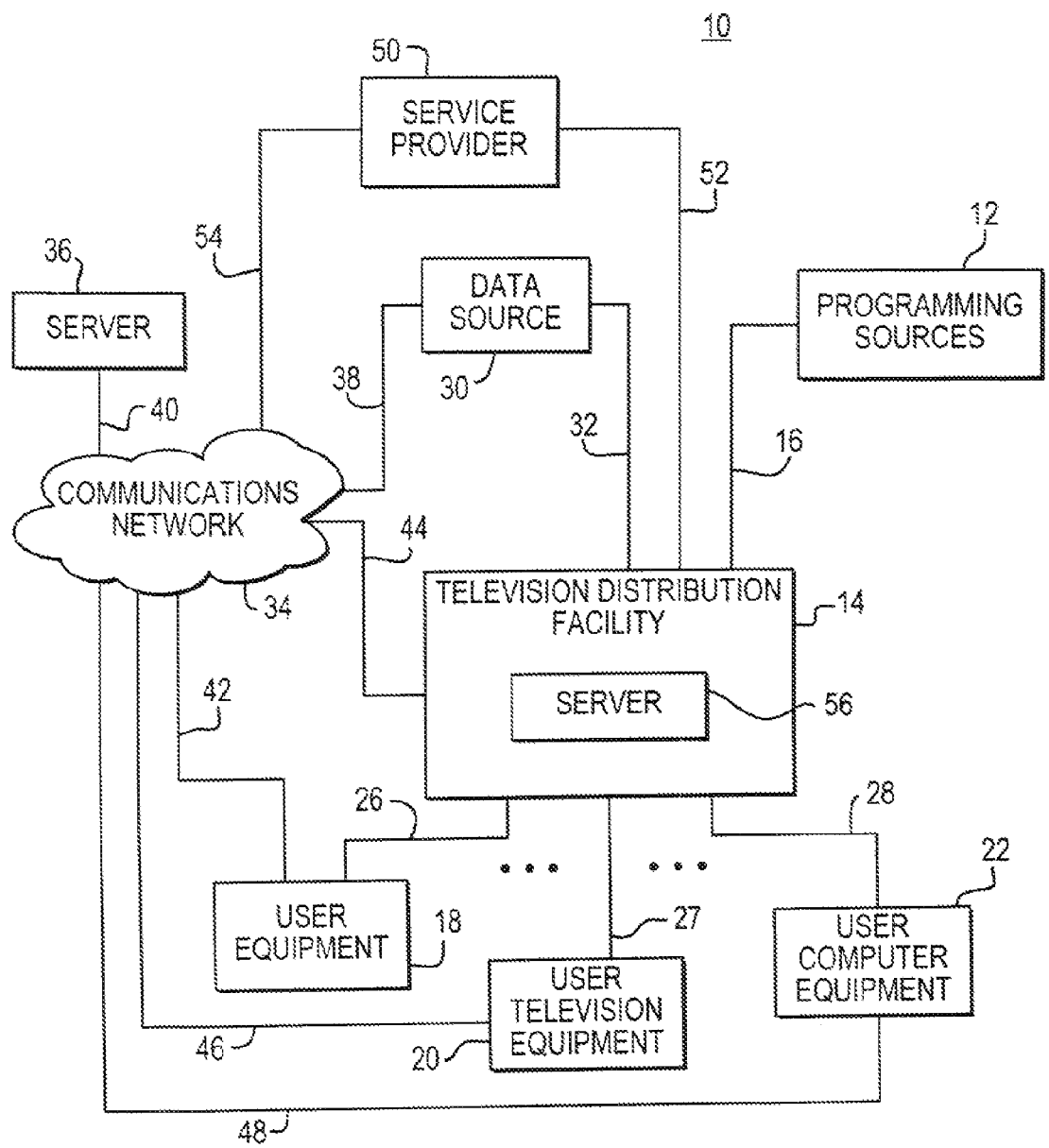
FIG. 1 is a diagram of an illustrative interactive television system in accordance with the present invention.

An illustrative interactive television system 10 in accordance with the present invention is shown in FIG. 1. Content such as television programming and digital music may he provided from programming sources 12 to television distribution facilities such as television distribution facility 14 using communications path 16. Programming sources 12 may be any suitable sources of television and music programming, such as television and music production studios, etc.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

The user equipment may receive television and music programming and other information from television distribution facility 14 over communications paths such as communications paths 26, 27, and 28. The user equipment may also transmit signals to television distribution facility 14 over paths 26, 27, and 28, Paths 26, 27, and 28 may be cables or other wired connections, free-space connections (e.g., for broadcast or other wireless signals), satellite links, etc.

Data source 30 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), information on actors and actresses, running times, etc. Data source 30 may also be used to provide advertisements (e.g., program guide advertisements and advertisements tor other interactive television applications), real-time data such as sports scores, stock quotes, news, weather, etc. Although data source 30 is drawn as an individual box in FIG. 1, data source 30 and the other system components of FIG. 1 way be provided using equipment at one or more locations. Systems components are drawn as single boxes FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, a combination of such paths, etc. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on digital music for the user. An interactive television program guide application or other suitable application may be used to display such information on the user's display.

An on-line program guide and other interactive television services may be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, etc. Communications network 34 may be any suitable communications network, such as the Internet, the public switched telephone network, a packet-based network, etc.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, fiber-optic path, satellite path, a combination of such paths, etc.

User equipment such as user television equipment 20 and user computer equipment 22 may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, wireless paths, satellite paths, a combination of such paths, etc.

Program guide application functions and the functions of other interactive television applications may be supported using server 36 and other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, a combination of such paths, etc.

Another example of an interactive television application is a home banking application. A home banking service may be supported using personnel at facilities such as service provider 50. An interactive home banking application that is implemented using the user equipment may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to the user equipment when requested by users. An interactive television application may be used to support the functions of a personal video recorder (sometimes called a digital video recorder) that is implemented using user equipment 18. Illustrative equipment that may be used to support personal video recorder functions include specialized personal video recorder devices, integrated receiver decoders (IRDs), set-top boxes with integrated or external hard drives, or personal computers with video recording capabilities.

If desired, applications such as the interactive television program guide application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications.

Moreover, the interactive television program guide application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in interactive television system 10 may be implemented locally on the user equipment. The applications may also be implemented in a distributed fashion (e.g., using a client-server architecture in which the user equipment serves at least partly and for at least some of the time, as the client and a server such as server 56 at television distribution facility 14, server 36, or other suitable equipment acts as the server. Other distributed architectures may also be used if desired. Moreover, some or ail of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, etc, the software that supports these features may be referred to as an application or applications.

Figure 2:
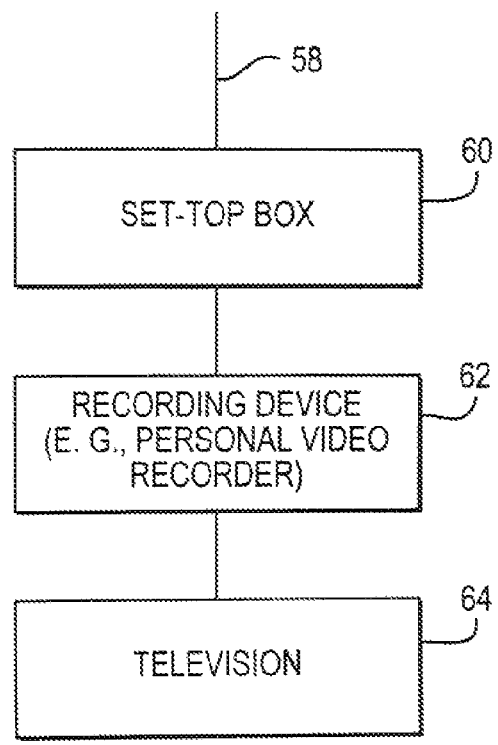
FIG. 2 is a diagram or illustrative user television equipment in accordance with the present invention.

Illustrative user television equipment 20 that is based on a set-cop box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may be any suitable analog or digital set-top box (e.g., a cable set-top box). Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may have communications circuitry such as a cable modem, an integrated services digital network (ISDN) modem, a digital subscriber line (DSL) modem, a telephone modem, wireless modem, etc. for communications with other equipment. Such communications may involve the Internet or any other suitable communications net-works or paths. If desired, the components of set-top box 60 may be integrated into other user equipment (e.g., a television or videocassette recorder).

Recording device 62 may be used to record videos provided by set-top box 60. For example, if set-top box 60 is tuned to a given television channel, the video signal for that television channel may be passed to recording device 62 for recording on a videocassette, compact disc, digital video disk, or internal hard drive or other storage device. Recording device 62 may have communications circuitry such as a cable modem, an ISDN modem, a DSL modem, a telephone modem, etc. for communications with other equipment. Such communications may involve the Internet or any other suitable communications networks or paths. The components of recording device 62 may be integrated into other user equipment (e.g., a television, stereo equipment, etc.).

Recording device 62 may be controlled using a remote control or other suitable user interface. If desired, video recorder functions such as start, stop, record, etc. and other functions for device 62 may be controlled by set-top box 60. For example, set-top box 60 may control recording device 62 using infrared commands directed toward the remote control inputs of recording device 62 or set-top box 60 may control recording device 62 using other wired or wireless communications paths between box 60 and device 62.

The output of recording device 62 may be provided to television 64 for display to the user. If desired, multiple recording devices 62 or no recording device 62 may be used. If recording device 62 is not present or is not being actively used, the video signals from set-top box 60 may be provided directly to television 64. Any suitable television or monitor may be used to display the video. In the equipment of FIG. 2 and the other equipment of system 10, the audio associated with various video items is typically distributed with those video items and is generally played back to the user as the videos are played.

Figure 3:
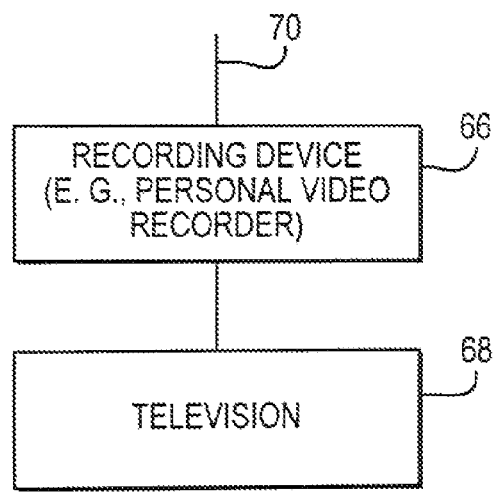
FIG. 3 is a diagram of additional illustrative user television equipment in accordance with the present invention.

Another illustrative arrangement for user television equipment 20 is shown in FIG. 3. In the example of FIG. 3, user television equipment 20 includes a recording device 66 such as a digital video recorder (e.g., a personal video recorder (PVR)) that uses a hard disk or other storage for recording video or may be a digital video disc recorder, compact disc recorder, videocassette recorder, or other suitable recording device. Equipment 20 of FIG. 3 may also include a television 68. Input/output 70 may be connected to communications paths such as paths 27 and 46. Television programming and other information may be received using input/output 70. Commands and requests and other information from the user may be transmitted ever input/output 70.

Recording device 66 may contain at least one analog tuner for tuning to a desired analog television channel (e.g., multiple tuners may be provided). Recording device 66 may also contain digital decoding circuitry for receiving digital television and music channels. If desired, recording device 66 may contain circuitry for handling both analog and digital channels. Recording device 66 also contains a processor (e.g., a microcontroller or microprocessor or the like) that is used to execute software applications. Recording device 66 may contain memory such as random-access memory for use when executing applications. Nonvolatile memory may also be used to store a boot-up routine or other instructions. The hard disk and other storage in recording device 66 may be used to support databases (e.g., program guide databases or interactive television application databases). The hard disk or other storage in recording device 66 may also be used to record video such as television programs or video-on-demand content or other content provided to recording device 66 over input/output 70.

Recording device 66 may have IR communications circuitry or other suitable communications circuitry for communicating with a remote control. Recording device 66 may also have dedicated buttons and a front-panel display. The front-panel display may, for example, be used to display the current channel to which the recording device is tuned.

Recording device 65 may also have communications circuitry such as a cable modem, an ISDN modem, a DSL modem, a telephone modem, a wireless modem, etc. for communications with other equipment. Such communications may involve the Internet or other suitable communications networks or paths.

If desired, recording device 66 may include a satellite receiver or other equipment that has wireless communications circuitry for receiving satellite signals.

Recording device 66 of FIG. 3 or recording device 62 of FIG. 2 may record now video while previously recorded video is being played back on television 68 or 64. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing. Recording device 66 and 62 may also be used to allow a user to watch a previously-recorded program while simultaneously recording a new program.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 60, digital video recorder 66, a WebTV box, or PC/TV or the like may be integrated into a television or personal computer or other suitable device.

Figure 4:
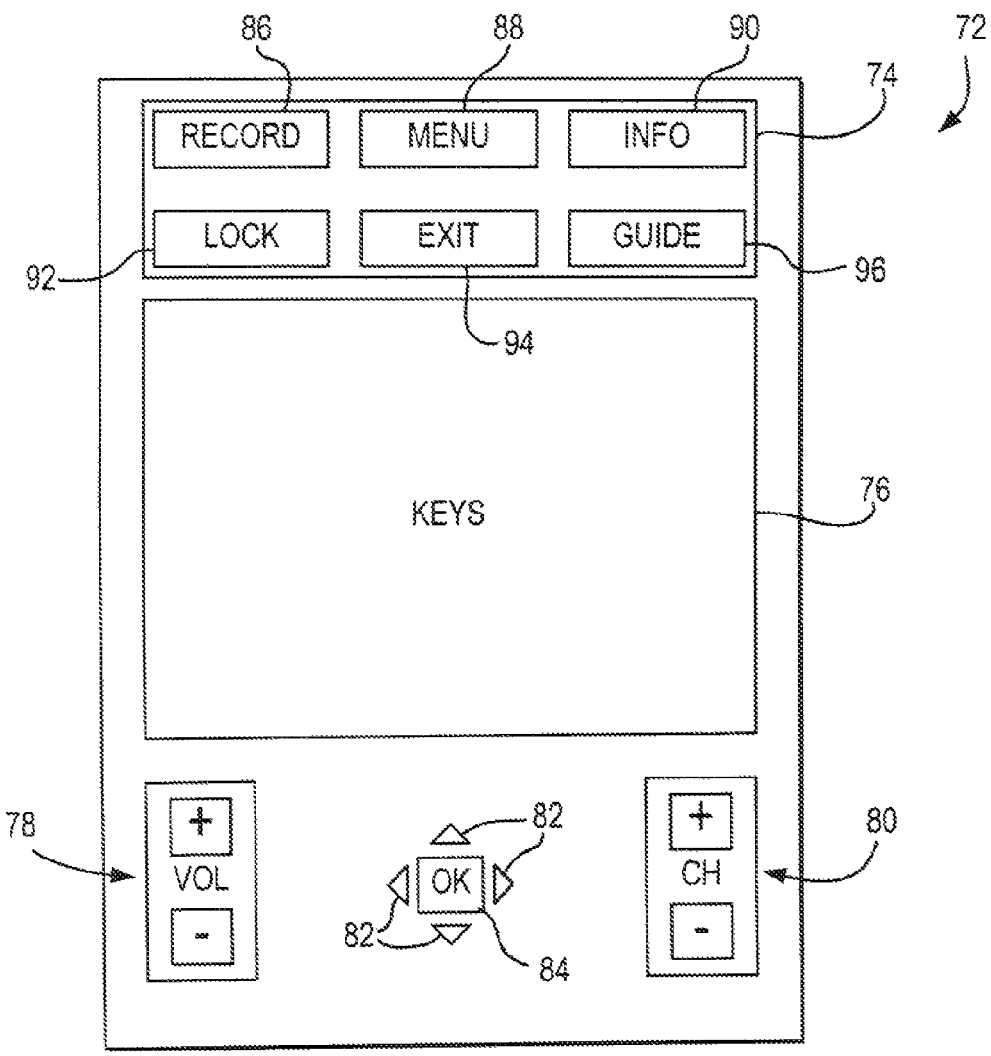
FIG. 4 is a diagram of an illustrative remote control in accordance with the present invention.

An illustrative remote control 72 for operating user television equipment 20 (or suitable user computer equipment 22) is shown in FIG. 4. Remote control 72 may have function keys 74 and other keys 76 such as keypad keys, power on/off keys, pause, stop, fast-forward and reverse keys, etc. Volume up and down keys 78 may be used for adjusting the volume of the audio portion of a video. Channel up and down keys 80 may be used to change television channels and to access content on virtual channels. Cursor keys 82 may be used to navigate on-screen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (sometimes called a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, pressing the info button 90 may direct the interactive television application to provide additional program schedule information related to that program listing (e.g., a program summary, actor information, etc.).

Lock button 92 may be used to modify access privileges. For example, a parent may use lock button 92 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on rating, channel, program title, etc. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television program guide.

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel or display screen). Video recorder function buttons such as a play button, pause button, stop button, rewind button, fast-forward button, and record button, may be used to control video recorder functions (local or network-based) in system 10. A help key may be used to invoke help functions such as context-sensitive on-screen help, etc.

Figure 5:
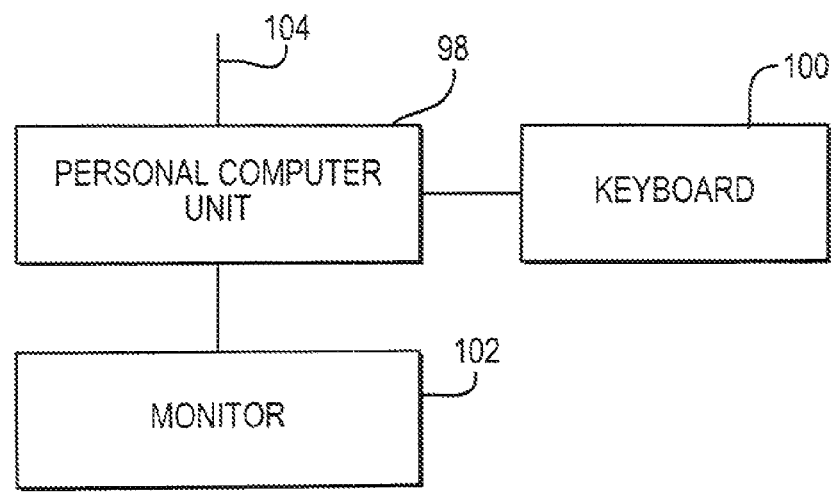
FIG. 5 is a diagram of illustrative user computer equipment in accordance with the present invention.

Illustrative user computer equipment 22 is shown in FIG. 5. In the arrangement of FIG. 5, personal computer 98 may be controlled by the user using keyboard 100 or other suitable user input device, such as a trackball, mouse, touch pad, touch screen, voice recognition system, a remote control such as remote control 72 of FIG. 4, etc. Video content such as television programming and interactive television application display screens may be displayed on monitor 102. Television programming, video-on-demand content, video recordings played back from a network-based video recorder, and other information stay be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television timer card that may be used may contain an analog television tuner for tuning to a given analog channel and digital decoding circuitry for filtering out a desired digital television or music channel from a packetized digital data stream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Storage in personal computer unit 98 such as a hard drive, DVD drive, CD drive, or other suitable storage device or devices may be used to store video and other content. For example, the interactive television application and personal computer unit 98 may use this storage to provide the functions of a personal video recorder.

User equipment 18 such as user television equipment 20 and user computer equipment 22 may be used with network equipment such as server 56, server 36, and equipment at service providers such as service provider 50 of FIG. 1 to provide network-based video recording functions. Video recording functions may be provided by storing copies of television programs and other video content on a remote server (e.g., server 55 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record, video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, the system 10 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

Figure 6:
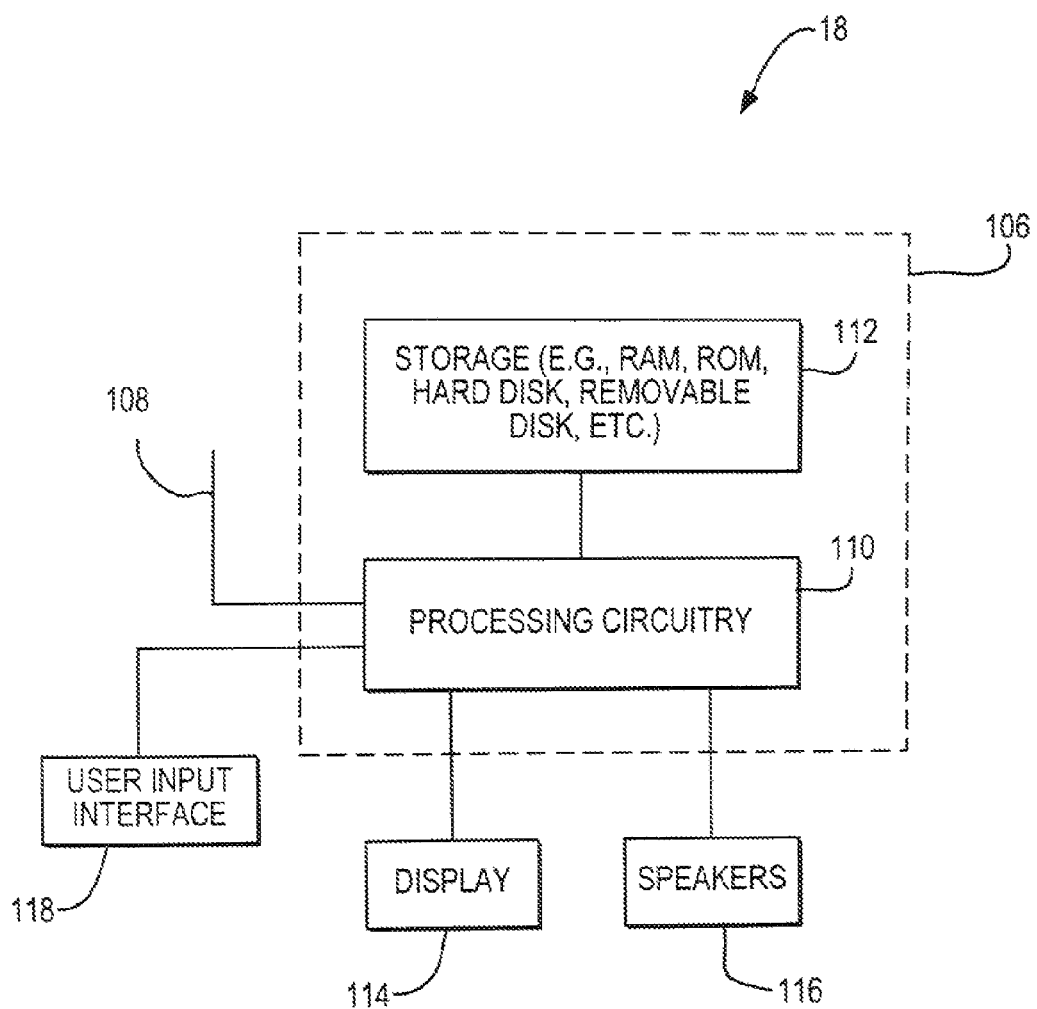
FIG. 6 is a generalized diagram of illustrative user equipment in accordance with the present invention.

The user television equipment and user computer equipment arrangements described above are merely illustrative. A more generalized embodiment of illustrative user equipment is shown in FIG. 6.

As shown in FIG. 5, control circuitry 106 is connected to input/output 108. Input/output 108 may be connected to one or more communications paths such as paths 26, 27, 28, 42, 46, and 48 of FIG. 1. Television and music programming may be received via input/output 108 (e.g., from programming sources 12, servers or other equipment such as server 36, service providers such as service provider 50, and television distribution facility 14). Program schedule information for an interactive television program guide may be received from data source 30 via input/output 108. Input/output 108 may also be used to receive information from, data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also be provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may foe stand-alone units. Digital music and the audio component of videos displayed on display 114 may be played through speakers 116.

A user may control the control circuitry 106 using user input interface 118. The user input interface 118 may be any suitable user interface, such as a mouse, trackball, keypad, keyboard, touch screen, touch pad, voice recognition interface, remote control, etc.

Figure 7:
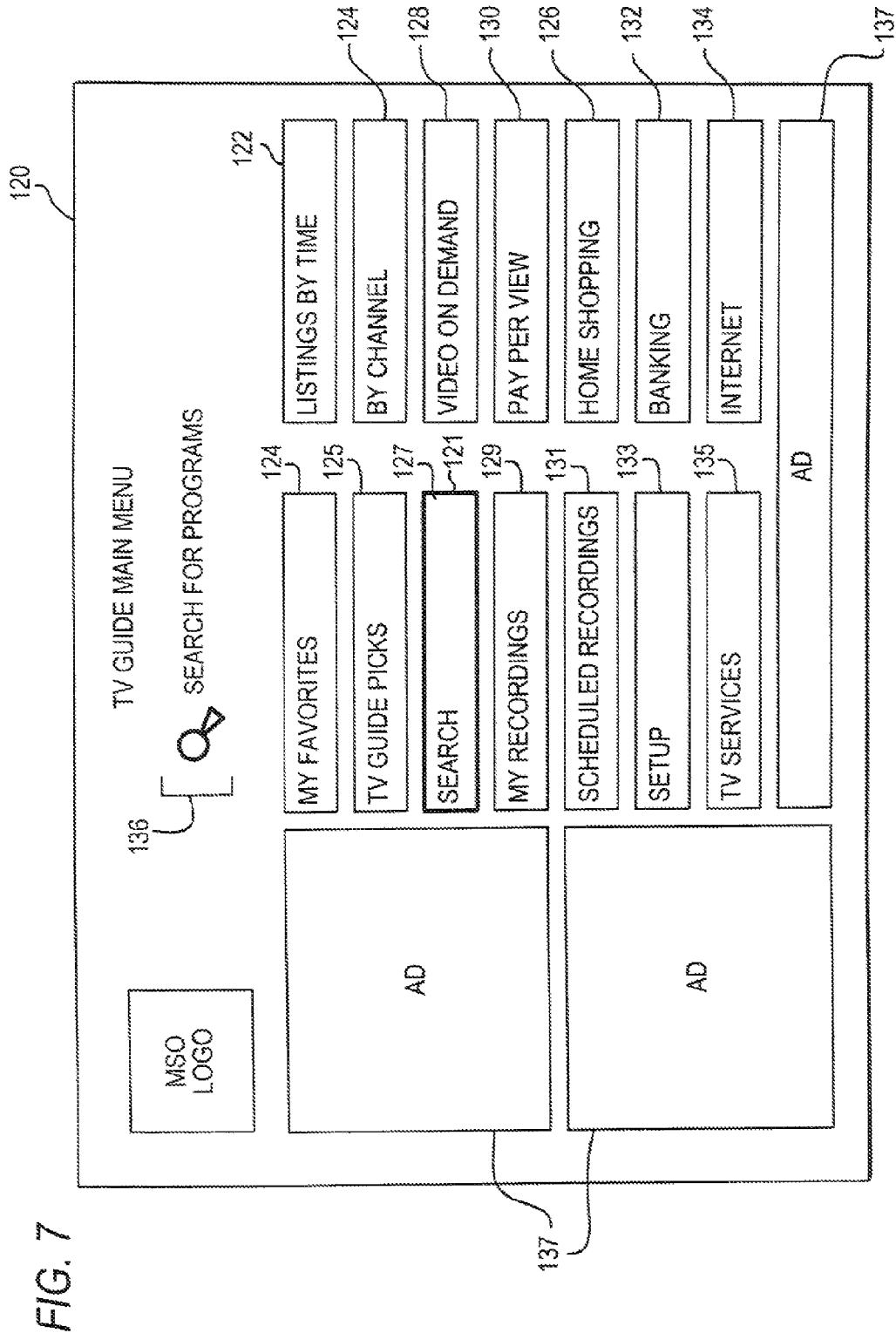
FIG. 7 shows an illustrative menu screen in accordance with the present invention.

An illustrative menu 120 that may be displayed on the user's display screen is shown in FIG. 7. As shown in FIG. 7, menu 120 may provide the user with an number of selectable options. The options shown in FIG. 7 are merely illustrative. Any suitable options may be provided if desired.

A user of user equipment 18 (e.g., a user of user television equipment 20 or a user of user computer equipment 22, or a user of any other suitable user equipment device) may invoke an interactive television menu such as menu screen 120 by pressing menu button 88 (FIG. 4). Remote control 72 (FIG. 4) or other user interface 118 (FIG. 6) may be used to position highlight region 121 on top of selectable options such as options 122-135. If the user selects option 122 or 123, a screen of program listings may be displayed. Option 124 may be used to display program listings for channels designated by the user as "favorites." Option 125 may be used to provide program listings selected for promotion by a service provider (e.g., a program guide service provider, a cable operator, etc.).

Option 126 may be used to invoke a home shopping service. Options 127 may be used to search program listings by title, time, category, or any other criteria. Option 128 may be selected to display options related to video-on-demand services. Option 129 may be selected to display an interactive list of previously recorded recordings and option 131 may be selected to display an interactive list of programs scheduled for recording. Option 130 may be selected to display pay-per-view program listings and pay-per-view services options. If the user selects option 132, the user may be presented with an opportunity to access home banking functions. Option 133 may be selected to change system setup options and option 134 may be selected to launch a web browser or other application for accessing the Internet. Option 135 may be selected to access other interactive television services. When the user selects an option with highlight region 121 from menu screen 120, the user's selection may be described in information display region 136.

If desired, program guide screens such as menu screen 120 and other interactive television application screens may include selectable advertisements 137. Any suitable advertisements may be provided, including panel advertisements, banner advertisements, advertisements provided between program listings, advertisements provided on certain program listings or other portions of the screen, or any other suitable advertisements. A user may use cursor keys 82 of remote control 72 (FIG. 4) to position a highlight region on an advertisement of interest and may select the highlighted advertisement using OK key 84. Users of other user interfaces may make appropriate selections using the buttons or controls available through those interfaces (e.g., using voice commands if the user interface involves a voice recognition arrangement, etc.).

Figure 8:
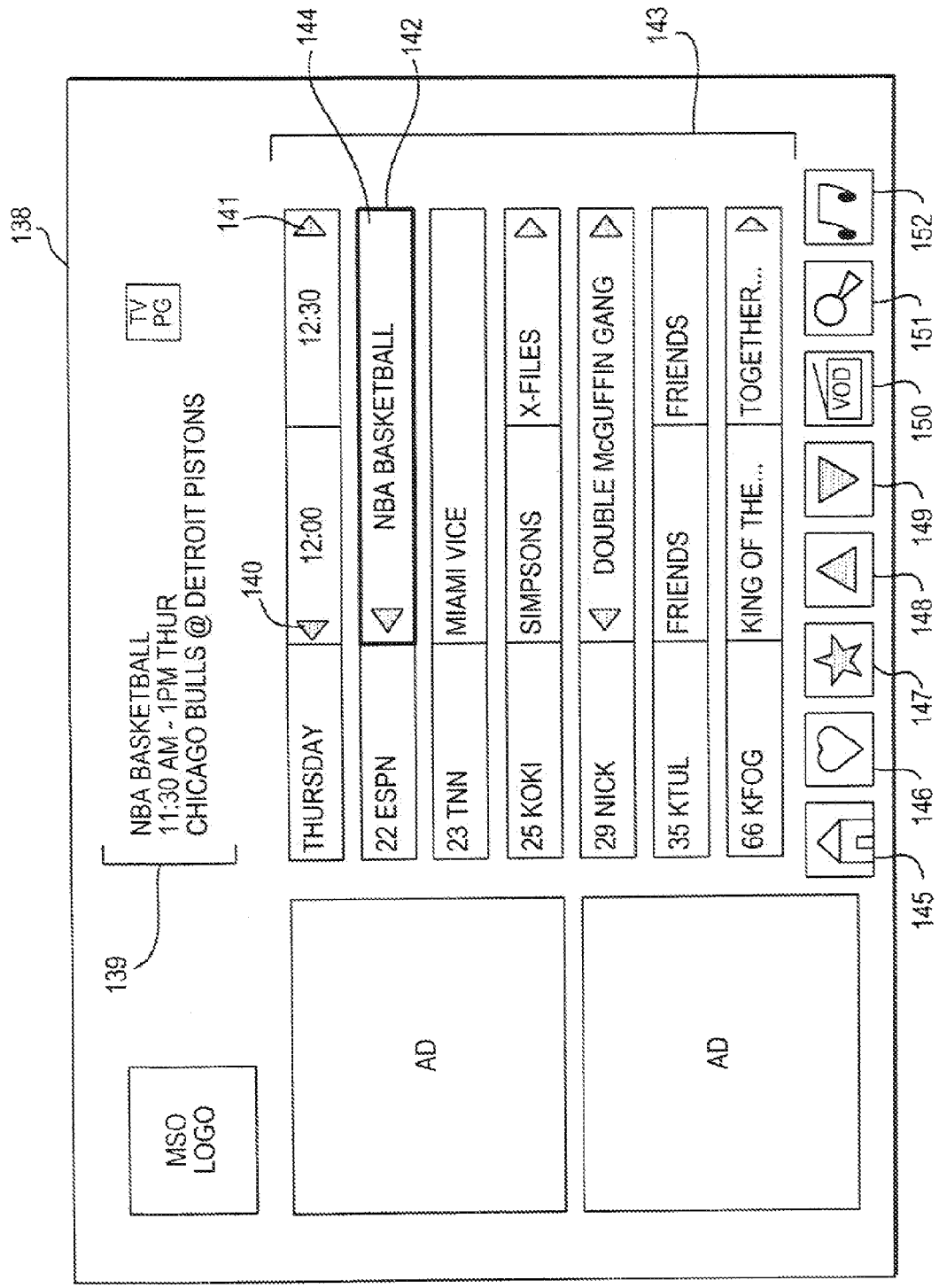
FIG. 8 shows an illustrative program guide screen in accordance with the present invention.

An illustrative program guide screen 138 that may be displayed for the user is shown in FIG. 8. Program guide screen 138 may be displayed, for example, when the user selects program listings option 122 of FIG. 7, when the user selects a suitable option from within an interactive television program guide application or other interactive television application, or when the user presses an appropriate remote control button such as guide button 96 or otherwise uses user input interface 118 to indicate a desire to view program listings.

Program guide screen 138 may contain a grid or list of program listings 143. Program listings 143 may include program titles, channels, scheduled broadcast times, and any other suitable program schedule information. Highlight region 142 may be used to select a desired program listing 144. Program information for selected programs may appear elsewhere on program guide screen 138 (e.g., in program information display region 139). If the user presses OK key 84 when a program listing for a current program is highlighted, the interactive television application may time to the channel for that program. If the user presses OK key 84 when a program listing for a futures program is highlighted, the interactive television application may provide the user with an opportunity to set a reminder for that program or to record that program.

Other functions that the interactive television application may provide include the ability to set favorites or establish preferences or other settings. For example, the user may select a particular channel for the program guide to automatically tune to when the user equipment is turned on. The user may also select favorite programs, favorite channels, etc. The program guide or other interactive television application may provide the user with the ability to establish parental control settings, the ability to search for programming of interest, and the ability to view program descriptions, advertisements, text, graphics, and video, etc. These are merely illustrative examples of interactive television functions that may be provided by interactive television system 10. Other suitable interactive television functions may be provided if desired.

A user may access program listings (e.g., program listings of the type shown in FIG. 8) by using the interactive television application to select an on-screen option such as option 122 and 123 of FIG. 7, by pressing a dedicated guide button such as guide button 96 on remote control 72, by selecting any other suitable button or on-screen option, etc. In the example of FIG. 8, program listings are currently being displayed for television programs that air between 12:00 noon and 1:00 PM. As shown by arrows 140 and 141, the user may use right or left cursor keys to navigate to other times (e.g., to direct the interactive television application to display appropriate screens of program listings 143 for different time periods). If desired, the user may select options or press keys (or use user input interface 118 to otherwise enter suitable commands) that direct the interactive television application to display program listings organized by channel, by genre, by service type (e.g., pay-per-view or regular broadcast televisions, etc.

Selectable options, such as options 145, 146, 147, 148, 149, 150, 151, and 152, may be provided as part of program guide screen 138 or any other program guide screen for providing access to various interactive television application features. For example, option 145 may be used to display a home screen or main menu, such as menu screen 120 of FIG. 7. Option 146 may be selected to display program listings for channels designated by the user as "favorites." Option 147 may be selected to display listings of recommended programs using highlight region 142. Scroll indicators 148 and 149 may be used to navigate down and up through program listings. Option 150 may be selected to display information related to video-on-demand services. Option 151 may be selected to search television program listings by title, time, category, or any other suitable criteria. Option 152 may be selected to display information related to digital music services.

Figure 9:
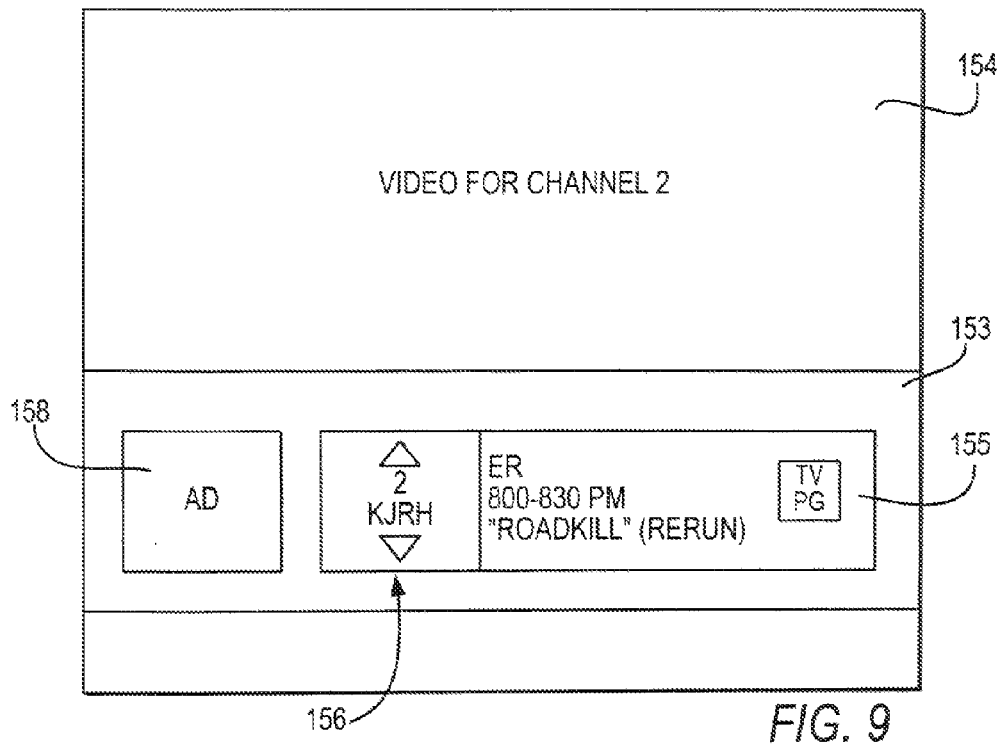
FIG. 9 is an illustrative display screen showing how a flip banner that contains program listings information for the current channel may be displayed as an overlay over video of the current channel in accordance with the present invention.

The interactive television application may provide a "flip" tuning feature. As shown in FIG. 9, when the user invokes the flip mode, flip display 153 may be provided over a portion of a channel (i.e., channel 2) that the user is currently tuned to and is watching on display screen 154. Flip display 153 contains information (in region 156) on the program 155 appearing on the current channel (channel 2) to which the set-top box 60 or other user equipment is tuned. The user may change the channel using channel up and down keys on the remote control or using user interface 118 to issue other suitable channel change commands. This simultaneously changes the channel to which the set-top box 60 or other user equipment is tuned and the channel information displayed in region 156 (and the associated program information 155).

The flip display 153 may be removed manually or automatically (e.g., after a few seconds or other suitable time period of user inactivity). When the user starts changing channels again, the flip display 153 may be displayed again.

The flip feature of the interactive television application therefore allows the user to view program information for the channel that the user is currently viewing as the user changes channels. In the example of FIG. 9, the flip display 153 is displayed in the form of an overlay on top of the current channel. If desired, the video for the current channel may be reduced in size and the flip information (e.g., the program title and channel information for the current program) may be displayed at a location on the periphery of the reduced-size video (e.g., at the bottom, side, or top of the reduced-size video).

An advertisement 158 or other content may be provided in the flip display region if desired. Other optional information that may be displayed in flip display 153 includes information on the scheduled broadcast times for the program 155, ratings information, program descriptions, and other program-related information.

Figure 10:
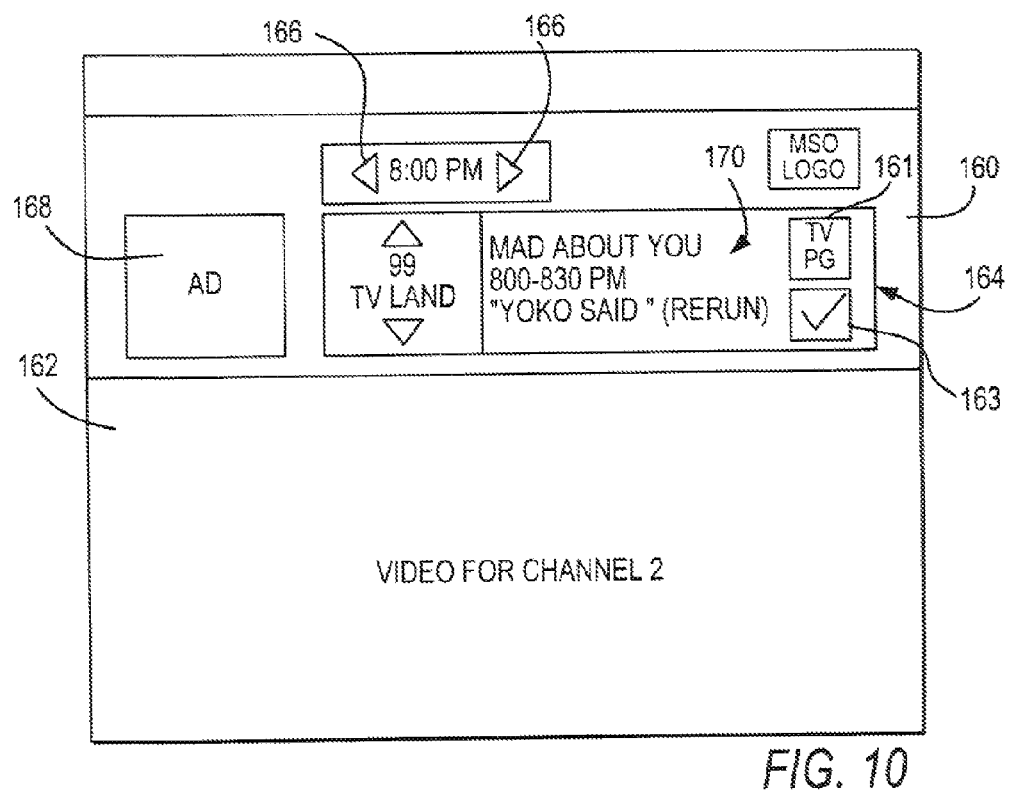
FIG. 10 is an illustrative display screen showing how a browse banner that contains program listings information for a channel that may differ from the current channel may be displayed as an overlay over video of the current channel in accordance with the present invention.

The interactive television application may also be used to provide a browse feature. As shown in FIG. 10, when the user invokes the browse feature (e.g., by pressing an up or down cursor key), browse display 160 may be displayed as an overlay over a portion of the channel (i.e., channel 2) that is being displayed on the user's display screen 162 and to which the user is currently tuned. Browse display 160 may initially contain information on the current channel. For example, browse display 160 may, when initially invoked by the user, contain the title of the current program and information on the current channel such as the current channel number, call letters, and network logo.

When the user presses the up or down cursor key (or enters other suitable commands using user interface 118), the browse display may be changed to display information on the programming available on other channels. In the example of FIG. 10, the user has pressed the cursor keys repeatedly, until the user has browsed to channel 99. The video that is being displayed on display screen 162 has not changed in this example (channel 2 is still being displayed).

As indicated by arrows 166, the user may use right and left cursor keys 82 (or other suitable controls) to browse to other time slots (e.g., to view information related to programming that is scheduled for broadcast at a later time). Browse display 160 may contain an advertisement 168, information 170 on scheduled program times, program descriptions and other program-related information and icons such as check icon 163 (to indicate that a reminder has been set for a given program) and ratings icon 161.

If the user locates a currently available program of interest on another channel, the user may press the OK key 84 to direct the interactive television application to tune the user equipment to that channel.

The browse display 160 may be removed manually or may be removed automatically from display screen 162 after a suitable period of user inactivity (e.g., after a few seconds or a minute or two).

If desired, the browse display can be displayed on the periphery of the video for the current program rather than as an overlay. The video for the current channel may be reduced in size accordingly.

Figure 11:
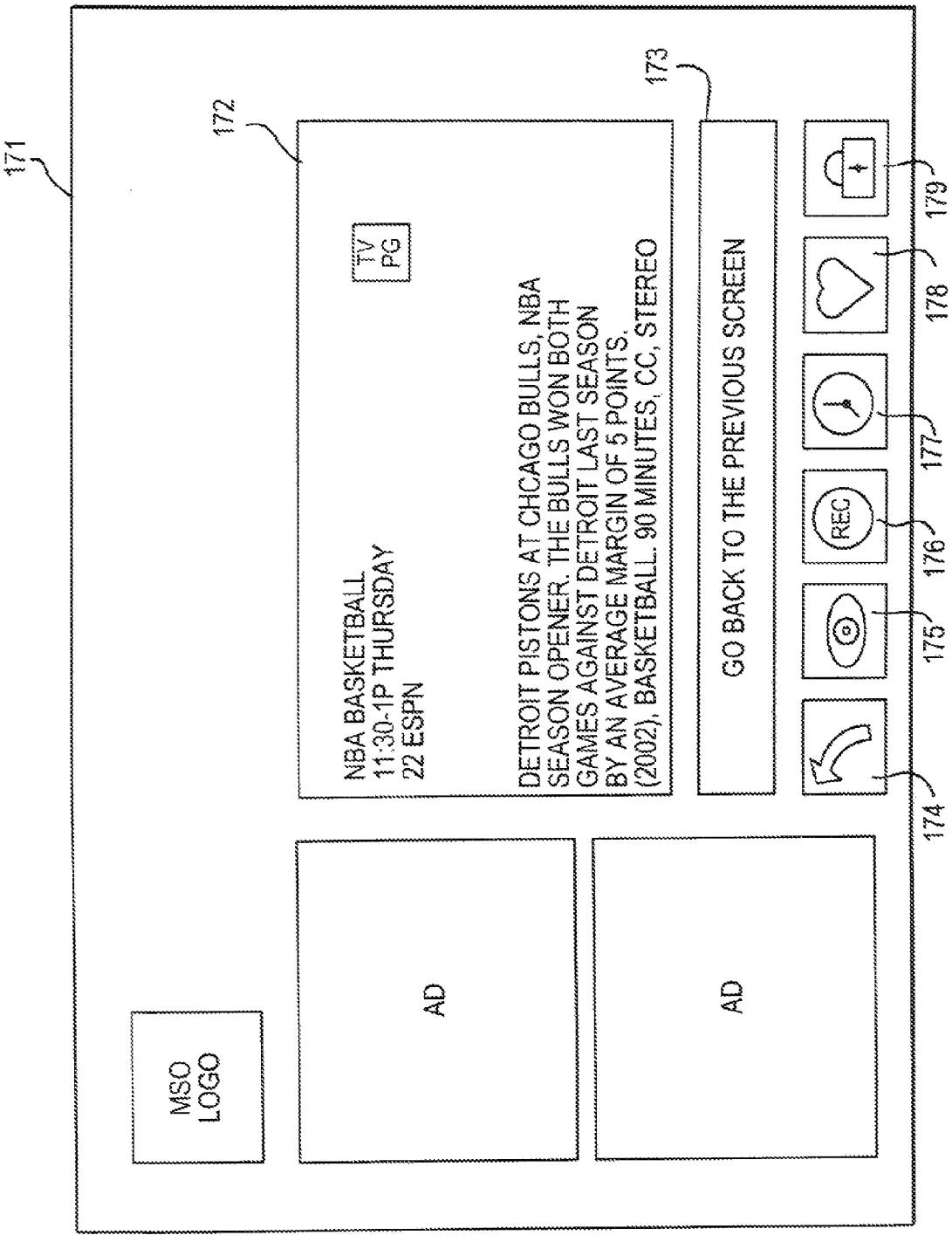
FIG. 11 shows an illustrative program guide screen in accordance with the present invention.
Figure 12:
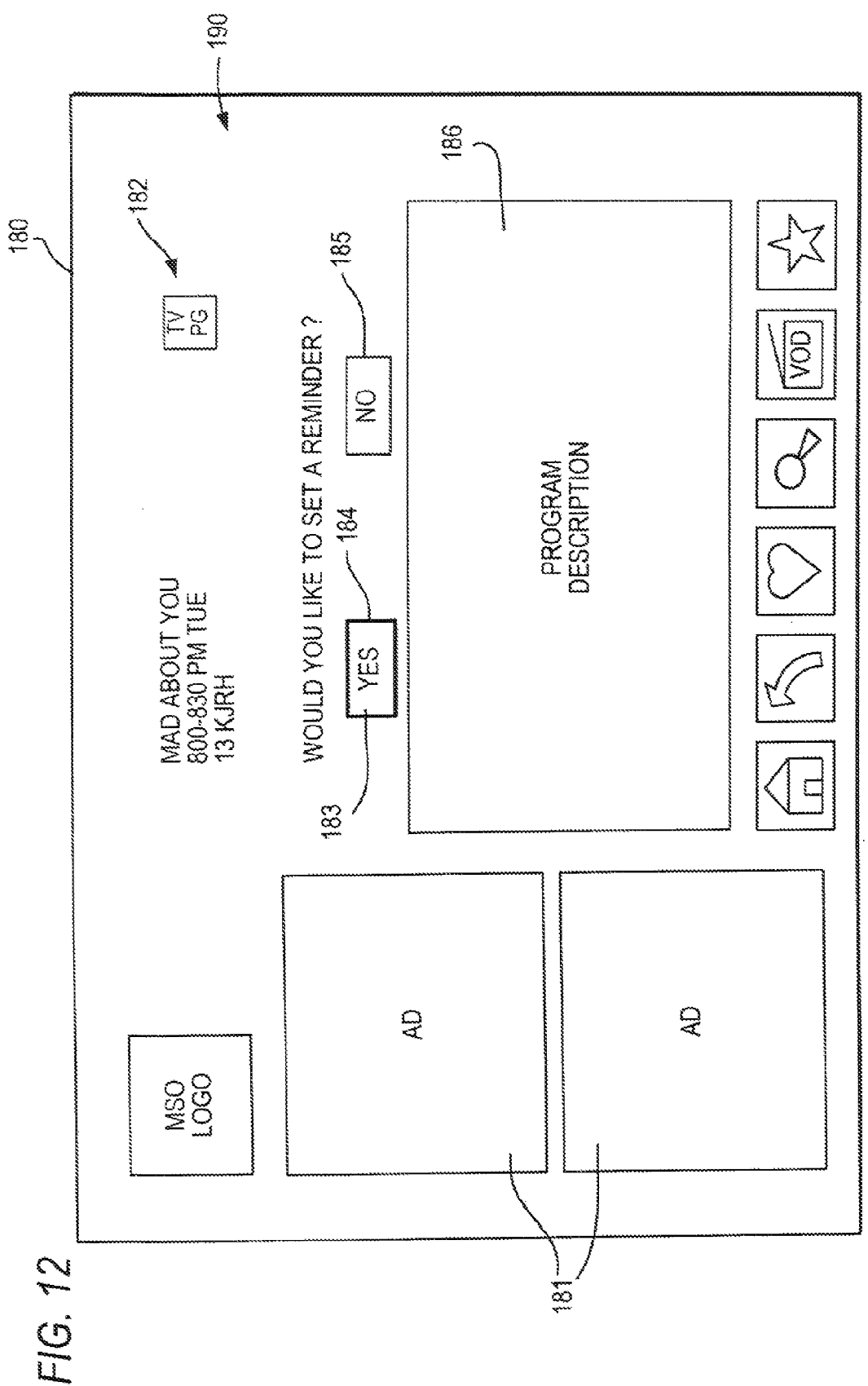
FIG. 12 is an illustrative display screen showing how an interactive television application may provide a user with an opportunity to set a program reminder in accordance with the present invention.

When the user has indicated interest in a program (e.g., by positioning highlight region 142 of FIG. 8 on top of a given program listing, by tuning to a program, by viewing a program listing on the flip banner of FIG. 9 or the browse banner of FIG. 10, etc.), the user may press info key 90 (FIG. 4) to obtain more information for that program. Illustrative info screens 171 and 180 that may be displayed when a user presses info button 90 are shown in FIGS. 11 and 12, respectively. Screens such as screens 171 and 180 may be provided when a user selects a program listing from a interactive television application screen (e.g., program guide screen 138 of FIG. 8). Info screen 171 of FIG. 11 may include a detailed description 172 of a program selected by the user. Description 172 may include, for example, the title, time, channel, and rating of the program, or any other suitable information. As in FIG. 8, selectable options may be provided as part of info screen 171 to provide access to various interactive television application features. For example, option 174 may be used to return to the previous program guide screen. Option 175 may be used to tune to the selected program or set a reminder for the selected program (e.g., the program for which information is displaying in description 172). Option 176 may be selected to display recording options and services for the selected program. Option 177 may be selected to display options for adding a reminder for the selected program. Option 178 may be used to display options for adding the selected program or channel to a user's favorites, and option 179 stay be used to display options for providing a parental lock on the selected program. Selectable options for other interactive television application features may also be provided. A highlight region may be used to select any of the selectable options provided by a program guide screen. Information describing a highlighted option may be provided, for example, in information display region 173.

Information screens may include advertisements. For example, info screen 180 of FIG. 12 may include selectable advertisements 181. Information regions on screen 180 such as title region 182 and program description region 186 may be used to display information on the selected program such as title information, ratings information, plot summary information, information about actors, genre, critics ratings, etc.

Region 190 may be used to inform the user of the possibility of setting a reminder for the selected program, of tuning to the channel showing the selected program, of recording the selected program, of purchasing the selected program if it is a pay-per-view program, of parentally controlling the selected program, of configuring a related profile or preference settings, or performing any other suitable action related to the selected program. Region 190 may also be used to provide additional information related to the selected program. The user may position highlight region 184 on top of either yes option 183 or no option 185 or any other suitable options (e.g., options to cone to the channel, to record the program, to purchase the program, to parentally control the program, to configure the preference settings, etc). When the user presses the OK key 84, the interactive television application may then take appropriate actions. If the user opts to set a reminder for the program listed in the info screen 180, the interactive television application may display a pop-up reminder overlay on top of the video for the channel that the user is currently watching just before the program associated with the reminder is scheduled to begin, or any suitable display screen that is active at the time that the reminder pops up (e.g., a program listings screen).

Figure 13:
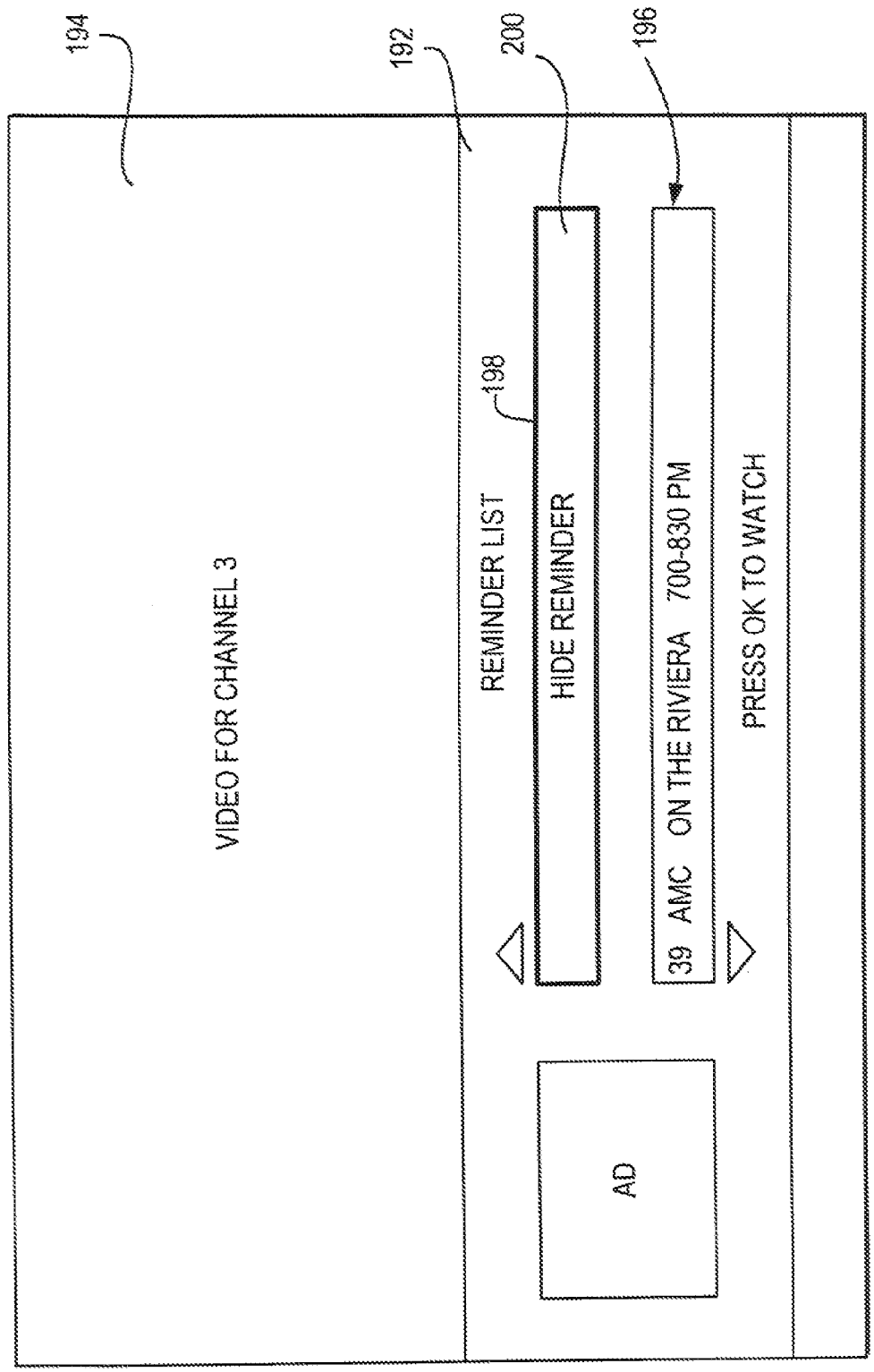
FIG. 13 is an illustrative display screen showing how a reminder may be provided for a user in accordance with the present invention.

An illustrative reminder is shown in FIG. 13. In the example of FIG. 13, the user is watching channel 3. The current time is 6:58 PM. Previously, the user set a reminder for the program "On The Riviera," which is scheduled to foe shown on channel 39 at 7:00 PM. Because the program for which the user set the reminder is just about to begin, the interactive television application displays reminder list 192 as an overlay on top of the video for channel 3 that is being presented on display screen 194. The reminder list may contain a list of one or more programs for which the user has set reminders. In the example of FIG. 13, one program listing 106 ("On The Riviera") is displayed.

The user can tune to a program by selecting that program from the reminder list 192. For example, the user may position highlight region 198 on listing 196 and may select that listing by pressing the OK key 84. The interactive television application may then tune the user to the channel for the desired program (i.e., channel 39 in this example).

The user can close the reminder list by pressing the OK key 84 while hide reminder option 200 is highlighted.

The reminder list may be displayed at any suitable time (e.g., at 0-15 minutes before the program of interest is to begin, at a user-selected time before that program, etc.). Moreover, the reminder list may be displayed around the periphery of the video for the current channel and the video for the current channel may be displayed in a reduced-size window. These are merely illustrative examples. Any suitable arrangement may be used to notify the user of upcoming programs or in-progress programs for which the user has set reminders and other programs of interest.

Figure 14:
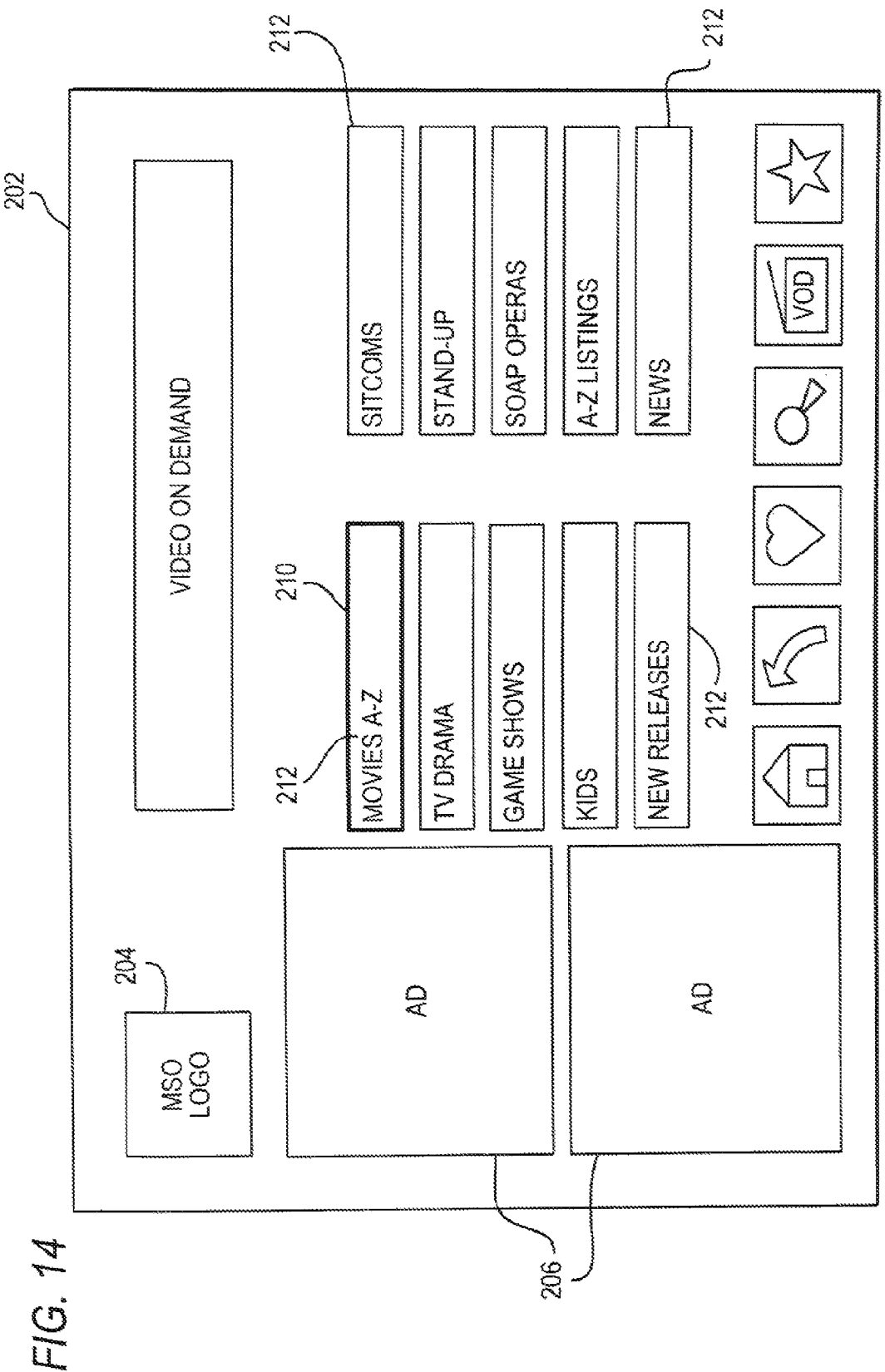
FIG. 14 is a display screen showing an illustrative video-on-demand menu that may be used to select a category of video-on-demand content in accordance with the present invention.

The interactive television application may be used to provide the user with access to video-on-demand content. The user may, for example, be provided with an option such as video-on-demand option 128 on menu screen 120 of FIG. 7. When the user selects option 128, the interactive television application may display a screen such as video-on-demand categories screen 202 of FIG. 14. Screen 202 may include logos such as logo 204, selectable (or non-selectable) advertisements such as advertisements 206, and a screen title 208. The user may position highlight region 210 on an option 212 corresponding to a video-on-demand category of interest.

Figure 15:
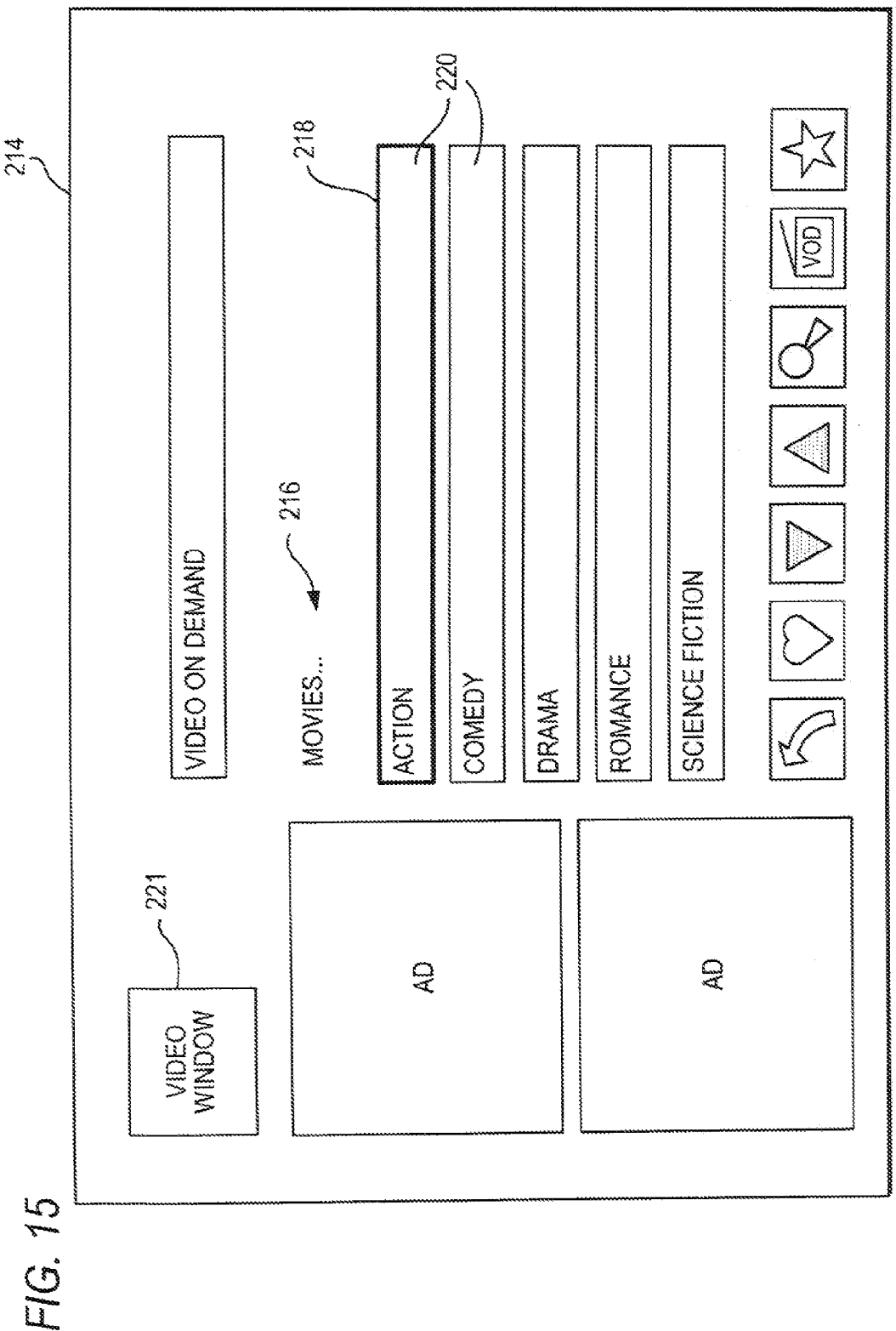
FIG. 15 is a display screen showing an illustrative video-on-demand menu screen that may be used to locate a desired type of movie in accordance with the present invention.

When the user selects the video-on-demand category of interest from screen 202, the interactive television application may display a display screen such as subcategory selection screen 214 of FIG. 15. In the example of FIG. 15, the subcategories screen 214 contains subcategory options 220 corresponding to movies, because (in this example) the user selected movies A-Z option 212 from screen 202 in FIG. 14. Video window 221 may be provided in any video-on-demand information screen and may provide information relating to a video-on-demand program selected by the user or any other suitable video information.

Figure 16:
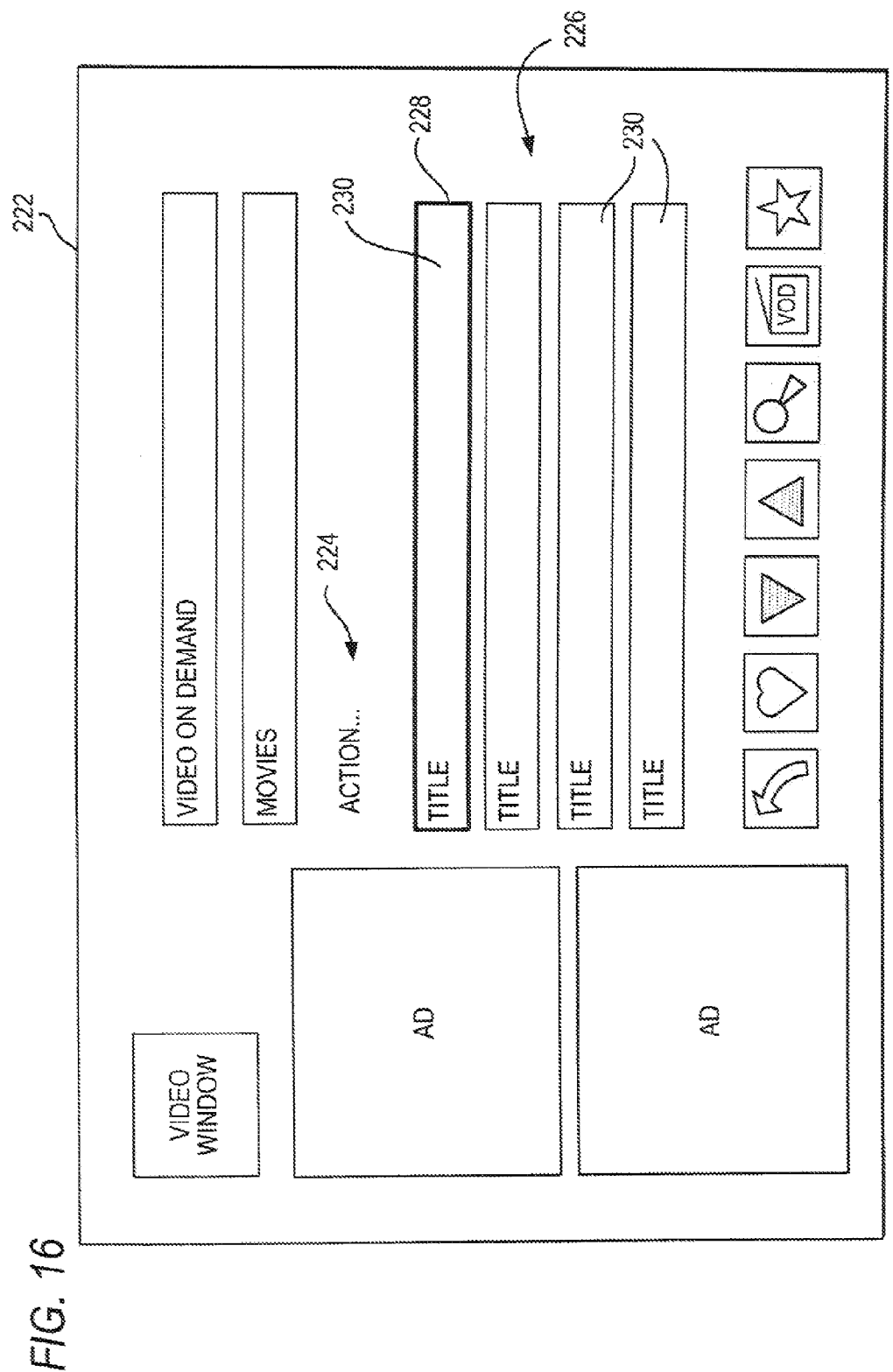
FIG. 16 shows an illustrative title menu that may be used to select a video-on-demand title of interest in accordance with the present invention.

The user may position highlight region 218 onto a desired subcategory 220 and may press OK key 84 to view a list of available video-on-demand content associated with that subcategory. An illustrative display screen 222 that the interactive television application may display for the user when the action subcategory option 220 (FIG. 15) is selected is shown in FIG. 16. As shown in FIG. 16, display screen 222 may include information identifying the selected subcategory 234. Screen 222 may also include a list 226 of titles 230 (or other content indicators). The user may position highlight region 228 on a desired video-on-demand title 230 and may press the OK key to proceed with the selection of that title.

Figure 17A:
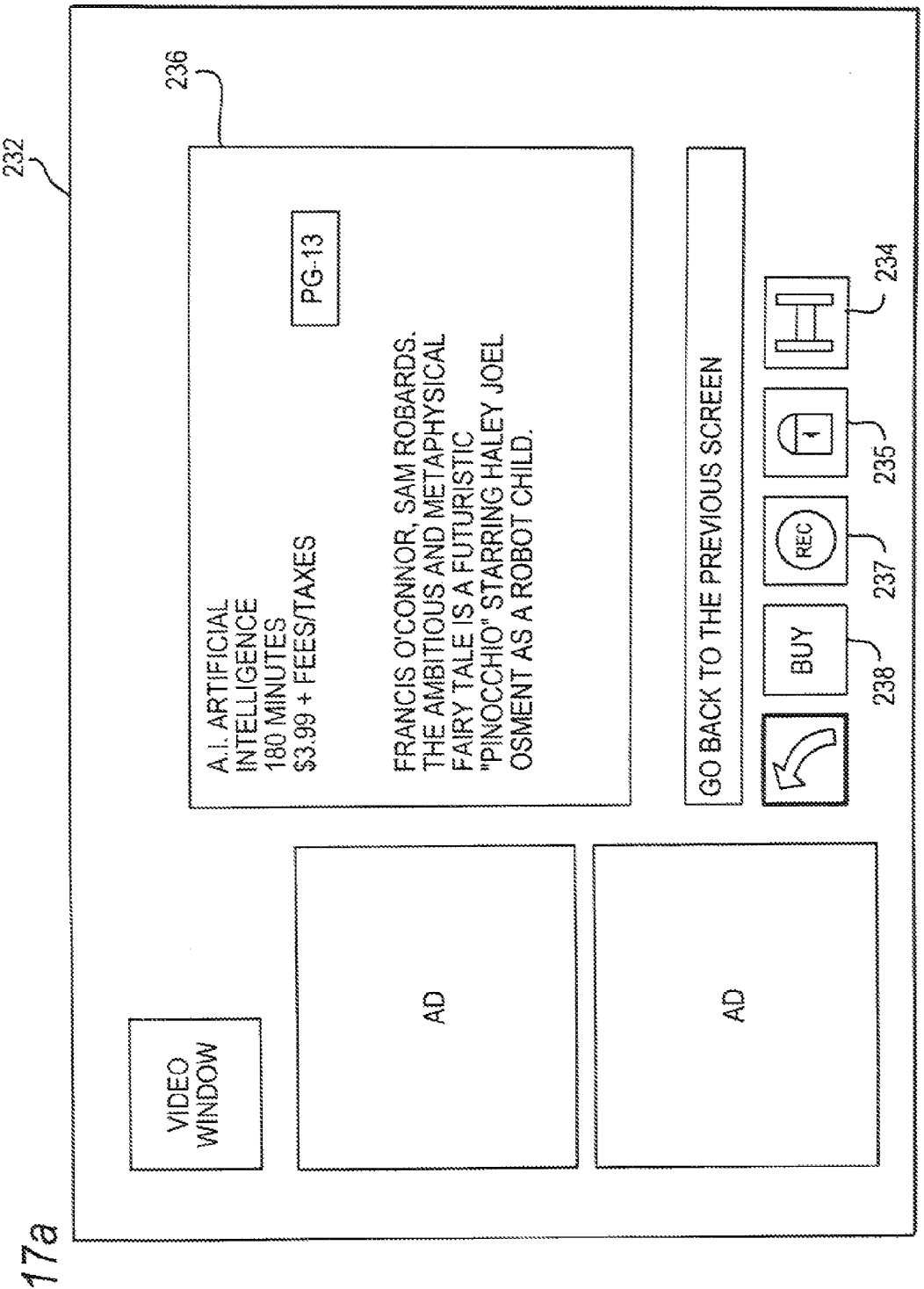
FIGS. 17a and 17b are illustrative video-on-demand information screens that may be used to access video-on-demand content in accordance with the present invention.

Selecting a desired video-on-demand title 230 from title selection screen 222 may direct the interactive television application to display a video-on-demand information screen such as information screen 232 of FIG. 17a. Screen 232 may include information 236 on the selected video-on-demand content, such as title, run time, price, rating, and a description of the selected video-on-demand content.

Selectable options, such as options 234, 235, 237, and 238 may be provided as part of screen 232 to provide access to various interactive television application features. For example, option 238 may be selected to access options for ordering the selected video-on-demand content. Option 237 may be used to access options for recording the selected content, and option 235 may be used to access options for setting parental control locks for the selected content. If the user selects option 234, the interactive television application may display a video clip containing information on the video-on-demand content of interest (e.g., a promotional video such as a preview, a trailer, a review, etc.). The video clip may be delivered to the user equipment 18 from a server such as server 36 or server 56 of FIG. 1 or from equipment at a service provider such a service provider 50. The interactive television application may also provide the user with additional information on the video-on-demand content in response to the user selecting option 234. Other suitable selectable options may also be provided on screen 232 (e.g., a program package information and purchase option, options for searching program listings for related content, etc.).

Figure 17B:
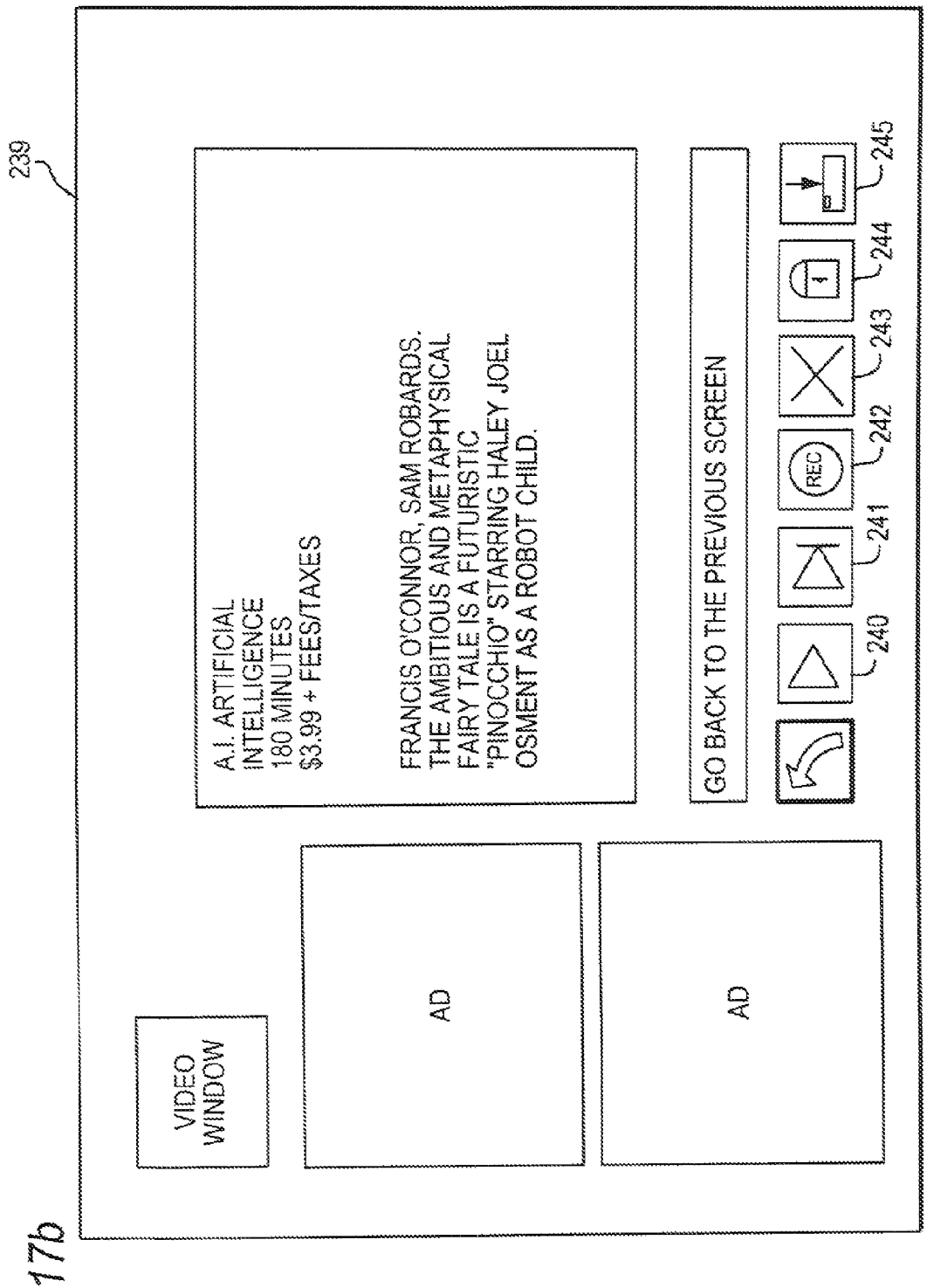

If a user requests information for video-on-demand content that has already been ordered, the interactive television application may provide video-on-demand information screen such as screen 239 of FIG. 17*b*, which may include selectable options different than those provided for screen 232 of FIG. 17*a*. For example, option 240 may be used to start playing selected video-on-demand content from the program position most recently viewed. Option 241 may be used to present the selected content from the beginning, and option 242 may be used to access options for recording the content. Option 243 may be used to remove the selected content from a listing of the ordered and available content. Option 244 may be used to access options for setting parental control locks for the selected content. If the selected content is being accessed over a network or being provided by a network storage device, option 245 may be used to store the content on a local storage device.

In response to a user ordering selected content (e.g., by selecting an on-screen order option such as option 238 of FIG. 17*a*, or by using remote control 72 or any other suitable input device 118 to order content, etc.), the interactive television application may deliver the ordered video-on-demand content to the user equipment from a server such as server 36 or server 56 or from a service provider such as service provider 50. The communications paths and communications network 34 of FIG. 1 may be used in delivering the requested content.

The ordered video-on-demand content may be displayed for the user on a display screen such as video-on-demand playback screen 246 of FIG. 18. As shown in the lower portion of screen 246, interactive options may be displayed in a toolbar 248 or other suitable format. The interactive options 248 (or similar remote control buttons) may allow the user to rewind the video-on-demand content to the beginning, rewind, play, fast-forward, pause, stop delivery of the video-on-demand content, or perform other video playback options. The arrangement of FIG. 18 is merely illustrative. For example, the video-on-demand content may be played back in a reduced size window (of fixed or user-selectable size).

The interactive television system 10 may be used to support video recorder functions. The video recorder functions may be supported using local arrangements (e.g., arrangements in which a personal video recorder or other suitable equipment in the user's home is used to record videos on a local hard drive or other storage device) and network-based arrangements (e.g., arrangements in which network equipment such as servers 36 and 56 or equipment at a service provider such as service provider 50 is used to store video and data for the user). Combinations of these arrangements may also be supported using system 10.

In a local video recorder arrangement (sometimes called a personal video recorder arrangement or local digital video recorder arrangement), video recordings are stored locally on the user equipment. Information on which videos have been recorded may also be maintained locally. Program guide information (e.g., titles, rates, descriptions, categories, etc.) may also be maintained for the recorded videos. When a user desires to view a list of the recordings that the user has stored on the user equipment, the interactive television application may retrieve this information from local storage and may display this information to the user locally on user equipment 18. The user may then select a desired recording to play back.

In a network-based video recorder arrangement (sometimes called a client-server video recorder Arrangement), videos may be stored on the network (e.g., at servers such as servers 36 and 56 or at a service provider such as service provider 50). Information on which programs have been recorded for the user may be stored locally and on the network (e.g., at servers such as servers 36 and 56 or at a service provider such as service provider 50).

Network-based recordings may be made in a number of ways. For example, some or all of the regularly-broadcast television programming provided by programming sources 12 may be automatically recorded or copies of this programming otherwise maintained on a suitable network storage device such as server 36, server 56, or equipment at a service provider such as service provider 50. If the user chooses to "record" a program, no actual recording need be made, because a copy of the desired program already exists on the system. With this type of arrangement, virtual recordings take the place of real recordings.

The user may be given a "personal area" on the network. The personal area may be accessed when the user enters an appropriate personal identification number or by virtue of the user's connection to the network through a known or trusted communications path (e.g., when the user is connected through a dedicated cable path to a server at a cable system headend such as a server 56 at television distribution facility 14 of FIG. 1).

The personal area may be used to maintain a list of the video content that the user has recorded. Whenever the user directs the network-based video recorder portion of the interactive television system to make a recording, the system updates the user's personal area to make it appear as though an additional "real" copy of the requested recording has been made. The network-based video recorder implemented with this approach therefore conserves storage space, while providing users with the illusion of access to a network-based video recorder dedicated to their personal use.

Alternatively, there may be no personal area and each user may have access to all previously recorded content to which they had rights when originally broadcast.

As another example, some or all of the content for which a user requests that a recording be made may be recorded by creating actual copies (e.g., digital recordings) of the requested content. These actual copies may be stored on network equipment (e.g., servers such as servers 36 and 56 or equipment at a service provider such as service provider 50).

Programs recorded onto a network server may be copied to a user's local storage.

A combination of these approaches may be used if desired. For example, some content may be automatically retained by the system (e.g., copies of popular programming). The user may make virtual recordings of this material. The presence of the virtual recordings may be reflected in the user's personal area. Other content may be stored in the form of actual recordings at the direction of the user (e.g., less popular content). The presence of these recordings may also foe reflected in the user's personal area.

Regardless of the way in which network-based recordings (virtual or real) and local recordings are made, the interactive television application may be used to provide the user with interactive display screens that assist the user in making recordings, managing recordings (e.g., editing recordings, deleting recordings, renaming recordings, sending recordings to other users over the communications paths of FIG. 1, etc.), playing back recordings, viewing information about recorded programs, etc.

Once a program has been selected by a user for recording, the selected program may be presented in an interactive list of programs scheduled to be recorded. An illustrative scheduled recordings screen 250 that may be displayed for the user on user equipment 18 is shown in FIG. 19*a*. Screen 250 may be displayed by the interactive television application when the user selects an option provided by another program guide screen, such as program guide screen 120 of FIG. 7 or any other suitable option. Screen 250 may include, for example, a list of programs scheduled to be recorded 251. A highlight region 252 may be used to select a scheduled recording from the list. The user may position highlight region 252 on a desired scheduled recording and select the scheduled recording using an appropriate key of remote control 72.

Figure 19B:
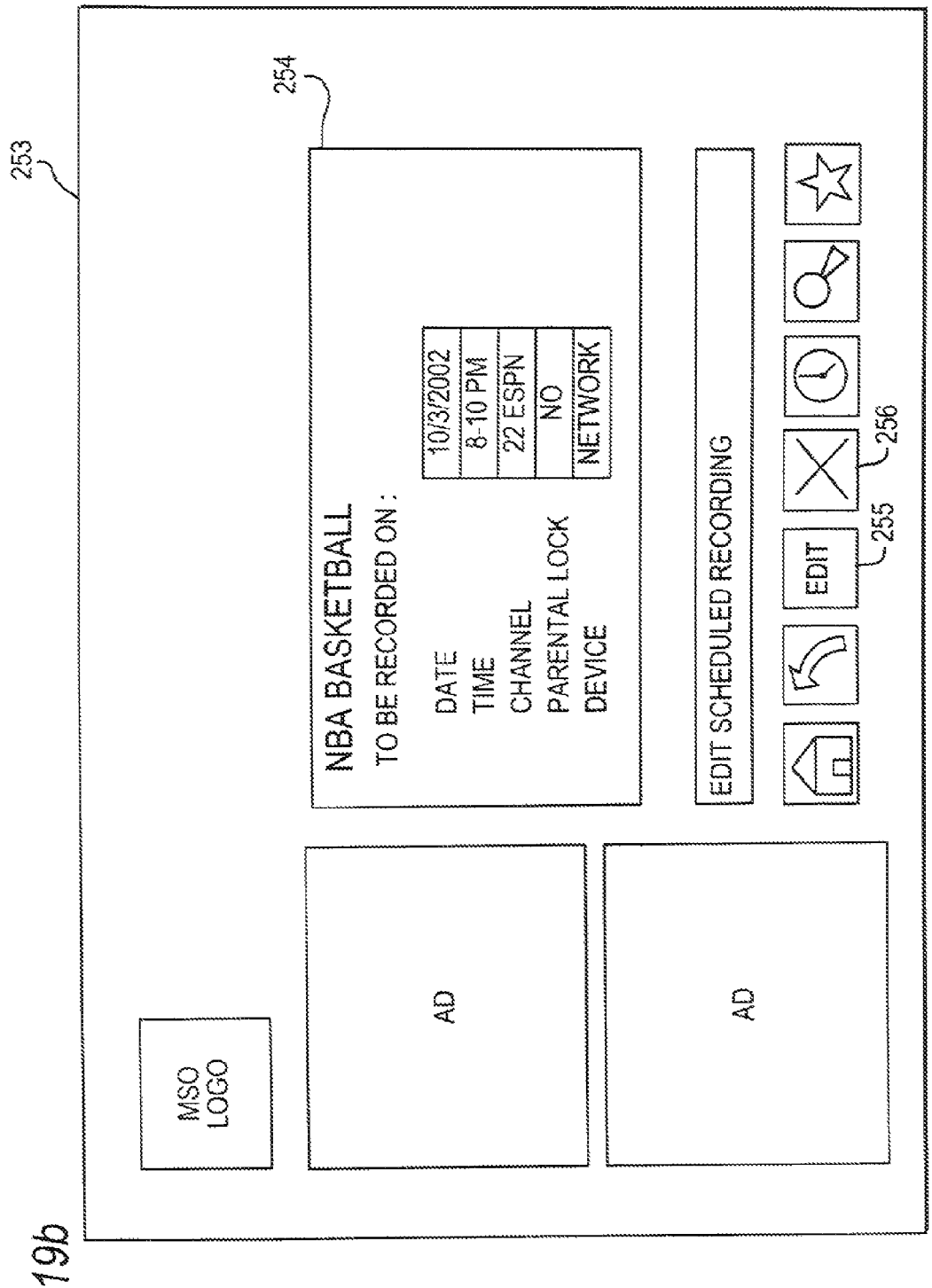

Information about a scheduled recording selected by the user may be presented in a screen such as screen 253 of FIG. 19*b*. Screen 253 may include scheduled recording information 254, which may show the date, time, and channel for which a program is to be recorded. Information 254 may also indicate which device has been designated to record the program and whether a parental lock is set for the program scheduled to be recorded. The user may edit information 254 by selecting edit option 255 using a highlight region. Other selectable options may be provided in screen 253, for example cancel option 256 which the user may select to cancel the scheduled recording.

Figure 20A:
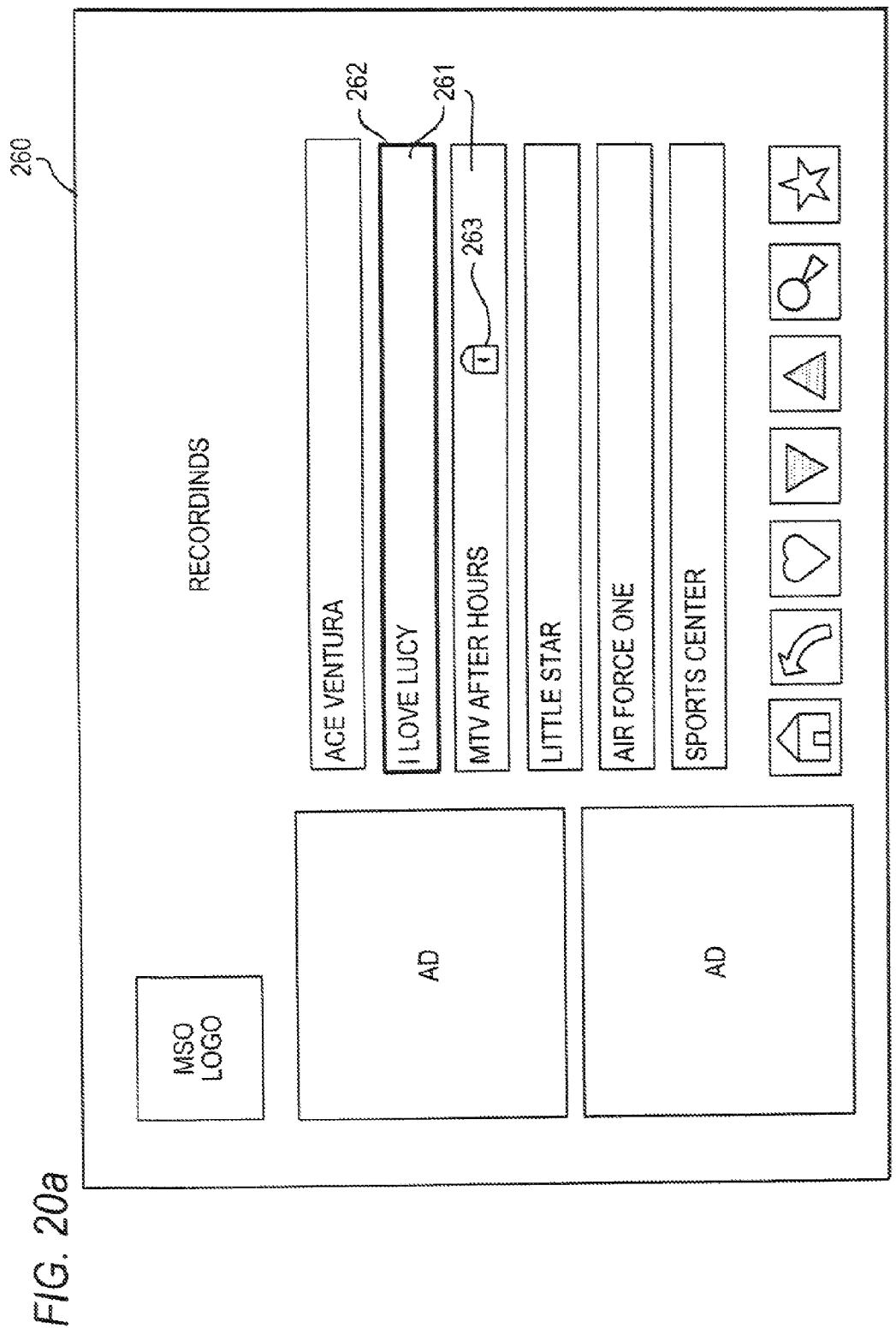
FIGS. 20a and 20b are illustrative display screens showing how a user's recordings may be presented and selected from an interactive list in accordance with the present invention.

Once a program has been recorded, a program guide screen may be presented to display recorded programs. An illustrative video recordings screen 260 that may be displayed for the user on user equipment 18 is shown in FIG. 20. Screen 260 may be displayed by the interactive television application when the user selects an option provided by another program guide screen, such as program guide screen 120 of FIG. 7 or any other suitable option. The recordings 261 may be local recordings that are stored on the user's equipment 18 or may be real or virtual network-based recordings (e.g., network-based content stored on equipment such as server 36 or server 56 or at service provider 50). In a network-based video recorder environment with a personal area, screens such as screen 260 provide access to all or part of the user's personal area. The user may navigate through the personal area using remote control 72 or other suitable user interface 18.

Screen 260 may include a list of the user's recordings 261. Recording listings may include the time and channel the program was recorded or any other suitable information. The user may position highlight region 262 to select a recording of interest (e.g., to view that recording, to view information about that program, to delete the program, etc.). The user may position highlight region 262 on a desired recording and select the recording using an appropriate key of remote control 72.

Figure 20B:
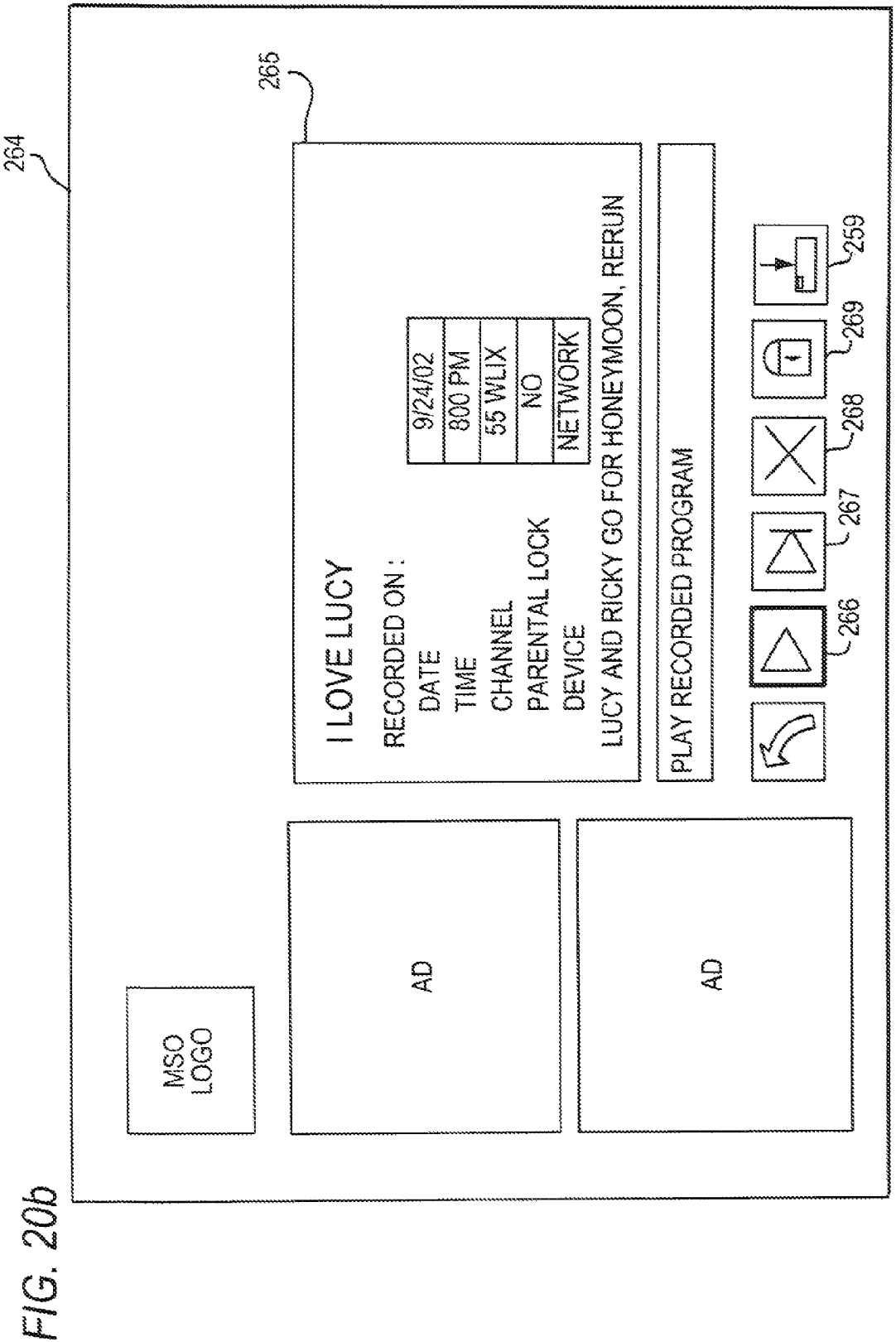

Information about a recording selected by the user may be presented in a screen such as screen 264 as illustrated in FIG. 20*b*. Screen 264 may include recording information 265, which may show the date, time, and channel the program was recorded. Information 265 may also show whether a parental lock is set for the recording and what device has been designated to store the recording. The user may play the recording by selecting option 266. The user may play the selected recording from the beginning by selecting option 267. Option 268 may be selected to delete the recording from the list of recordings. Option 269 may be used to set a parental lock for the selected recording. If the selected recording is being stored on a network video storage device, the user may select option 259 to transfer the recording to a local storage device. On-screen options may be selected using a highlight region and a remote control, or by any other suitable method.

When a given recording is selected for play back, for example by selecting play option 266, a display screen such as display screen 269 of FIG. 21 may be presented. Display screen 269 may include the video 270 of the selected program that is being played back to the user and options 271 for controlling the video. Options 271 may, for example, include options that allow the user to rewind the video to the beginning, to rewind or reverse the video, to play the video, to fast-forward the video, to pause the video, or to stop the video. Control of these functions and other interactive television application functions may be supported using on-screen options, dedicated or multi-purpose keys on remote control 72 or other user devices, or other suitable arrangements involving user interface 118. When on-screen options are used, the options may be displayed in the form of one or more overlays on top of video 270 or video 270 may be provided in a reduced-size window and the options displayed outside of this window.

With the arrangement of FIGS. 20 and 21, the user can browse the user's recordings and can play back (and control the playback) of these recordings. Recordings that are stored locally on user equipment 18 may be played back by retrieving these recordings from the local hard drive or other storage on which the recordings are maintained. Recordings that are stored on the network may be played back from the network equipment on which the recording content is stored. User equipment 18 may receive such content in the form of a real-time video scream or a file download and the interactive television application may play back the received content using a display screen arrangement of the type shown in FIG. 21.

The user may record programming by indicating interest in a program for recording by highlighting a program of interest on a suitable display screen provided by the interactive television application and pressing a record key, by selecting a program for recording from a flip or browse display, by tuning to a desired program and selecting an appropriate record button, by selecting a record option from an information screen, etc. For example, the user may highlight a program in a program listings screen such as screen 138 of FIG. 8, or may display a program listing of interest on a flip display such as flip display 153 of FIG. 9 or on a browse display such as browse display 160 of FIG. 10. When the user presses a suitable remote control key such as record key 86 of FIG. 4, the interactive television application may record the desired program.

Figure 22:
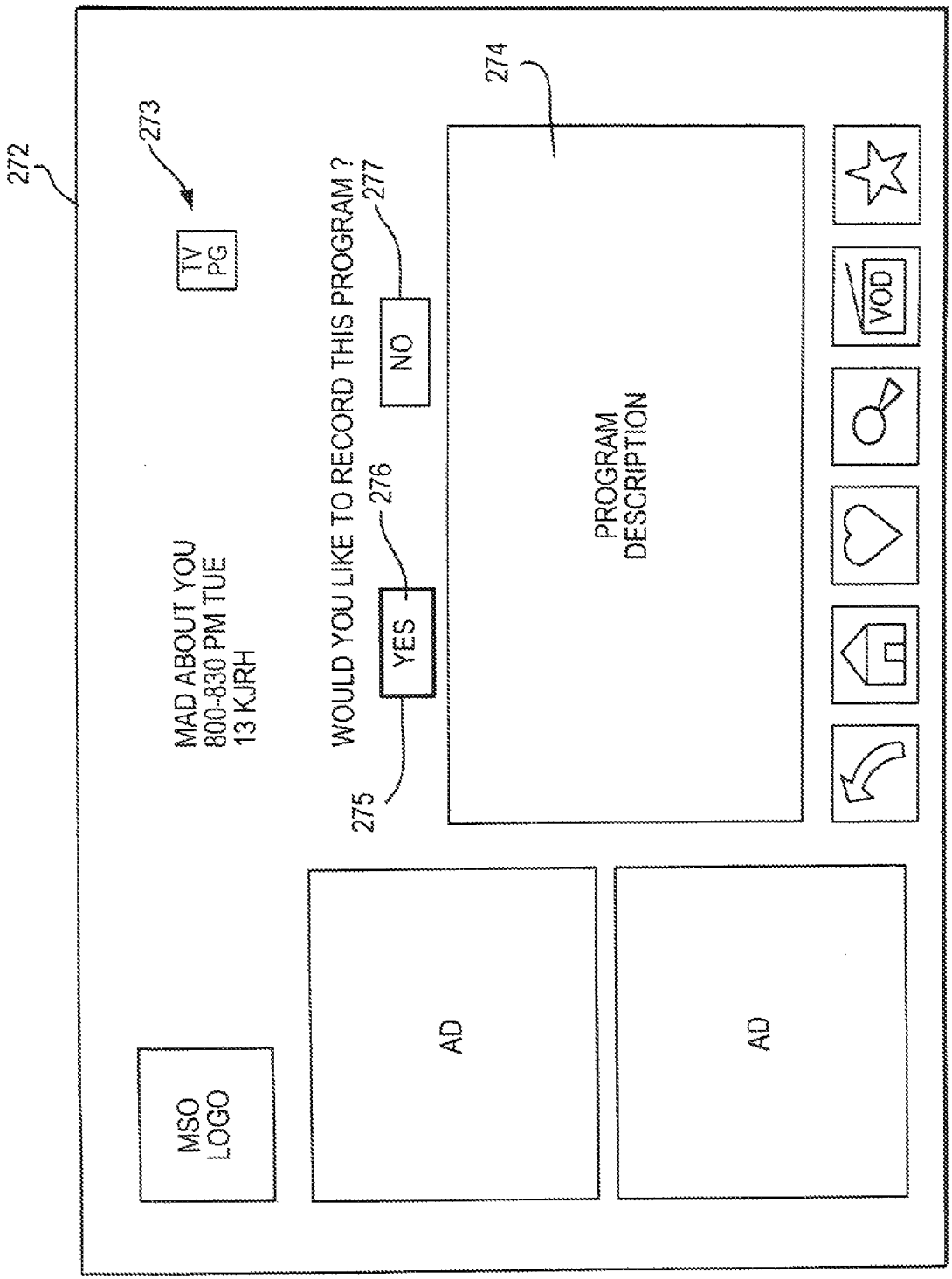
FIG. 22 is an illustrative display screen showing how the user may be provided with options that allow the user to schedule a recording of a desired program in accordance with the present invention.

The interactive television application may automatically record the program that the user selected or may provide one or more additional confirmation and information screens after the user presses the record key 86. As an example, the interactive television application may display a screen such as record set-up screen 272 of FIG. 22. As shown in FIG. 22, screen 272 may include title and ratings information in region 273 and a program description 274. The user may be provided with information on the scheduled broadcast time for the selected program. If the user desires to record the program, the user may position highlight region 275 on top of YES option 276 and may press OK key 84. If the user does not wish to record the program, the user may position highlight 275 on top of NO option 277 and may press the OK key 84. If desired, other options such as series recording options, recording quality options, and buffer time options may be provided.

When the user directs the interactive television application to record a given program, the interactive television application will record the program using the local capabilities of user equipment 18 or using the network-based video recorder capabilities of the system 10, depending on the equipment of the user, the capabilities of system 10, and system and user settings.

After the program has been recorded, the user may use the interactive television application to view information on the user's recordings (e.g., using a display screen arrangement of the type shown in FIG. 20). These techniques for supporting recording functionality in the interactive television application are merely illustrative. Any suitable arrangement for recording (as real recordings or as virtual recordings and locally or on network equipment) may be used if desired.

The interactive television application may allow the user to establish parental control settings. For example, the user may lock a particular program, a program rating, a channel, a type of content (e.g., violent or sexual content), or may establish a parental control setting that blocks all television viewing during a particular period of time. A user may be required to enter a personal identification number (PIN) to unlock blocked content.

With one illustrative arrangement, a parent (or other suitable user) may select a program to block by highlighting the program listing for that program in a suitable program listings screen (e.g., a screen such as screen 138 of FIG. 8). After highlighting the program to be blocked, the parent may press lock key 92 on remote control 72 (FIG. 4). The parent may also access options for setting parental locks by selecting an on-screen parental control lock option provided by the interactive television application (e.g., option 234 of FIG. 17*a*, option 244 of FIG. 17*b*, etc.).

Figure 23A:
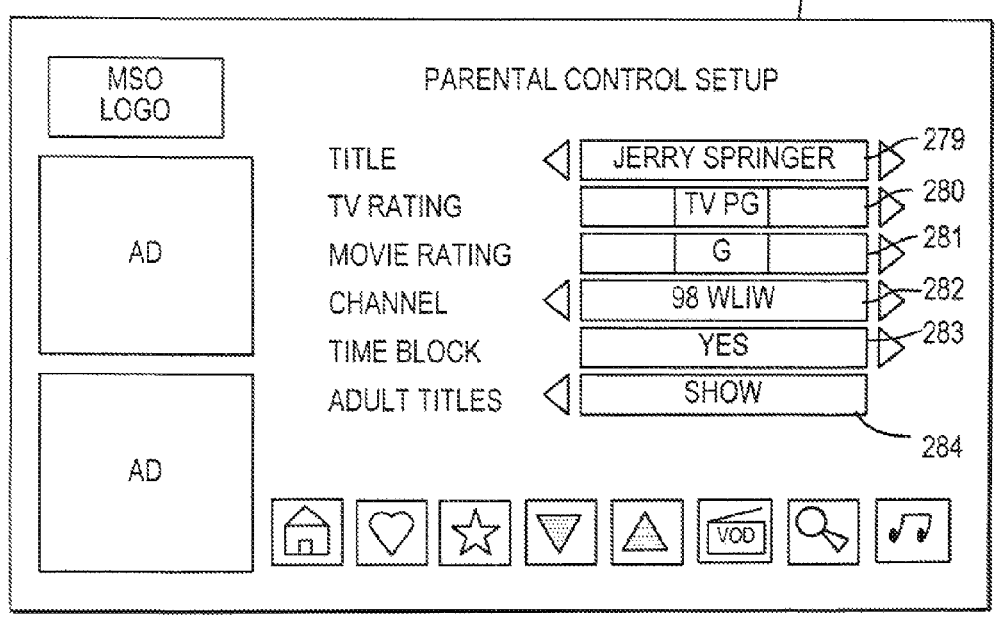
FIG. 23a is an illustrative display screen showing how a user may set parental controls for a given program in accordance with the present invention.

In response to a user selecting an on-screen option or remote control key to access parental control lock options, the interactive television application may display a display screen such as parental controls display screen 278 of FIG. 23*a*. Parental controls options may be accessed from a main menu, a selected program, or any other suitable program guide screen. Users may set parental locks for a selected program or a range of programming by selecting from various criteria. For example, users may select to block programs according to title 279, TV rating 280, movie rating 281, channel 282, or any other suitable criteria. Block ratings options 280 and 281 may allow users to block all programming with a given rating (e.g., the same rating as the selected program or a user-input rating or range of ratings). The user may be provided with other options for applying parental lock settings by selecting, for example, (YES/NO) time block option 283. A user may also select to hide or show adult titles by selecting option 284. Other selectable options may also be provided in screen 278.

Figure 23B:
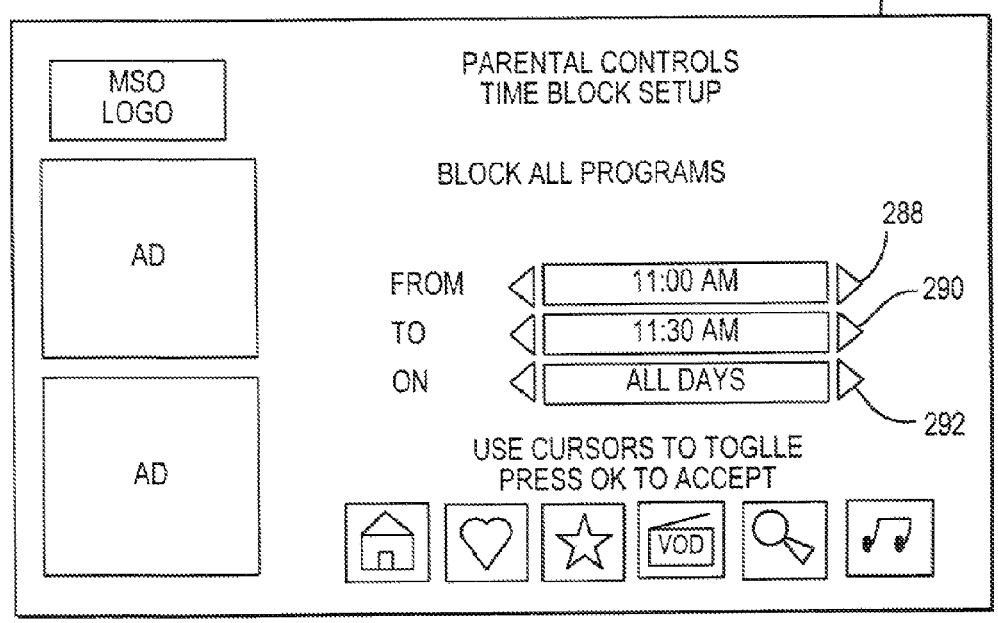
FIG. 23b is an illustrative display screen showing how a user may block content by creating a time-based parental control setting in accordance with the present invention.

If the user has selected "YES" for time block option 283, a time block sub-menu may be provided, for example, screen 286 of FIG. 23*b*. The user may use the on-screen options of screen 286 to set a beginning time (option 288) and ending time (option 290) for the parental control time period. The user may use option 292 to make the parental control setting effective for all days of the week, certain groups of days (e.g., week days or weekend days), or a particular day or days. The user may press OK key 84 when finished. Other selectable options may also be provided as part of screen 286.

The parental control screens 278 and 286 of FIGS. 23*a* and 23*b* are merely illustrative. Any suitable on-screen options or other user interface arrangement may be used to allow a parent (or other user) to block (parentally-control) programming airing during a particular period of time, programming on a particular channel or channels, programming with a certain rating, individual instances of certain programs, etc.

Interactive television application settings such as reminder settings, pay-per-view purchases, recording settings, and some parental control settings may be referred to as "time-based" settings, because these settings involve the element of time. In the reminder setting context, for example, reminders are made for programs that are to be aired at a specific time in the future. Recordings are also often scheduled for future broadcasts. Parental controls settings that block the viewing of a program that is aired at a specific time or that block all or some television viewing during a particular time window are also time-based settings.

These time-based settings may give rise to conflicts during the operation of the interactive television application. For example, a user may attempt to order a video-on-demand movie or may attempt to play back recorded video recorder content. If the duration of the requested video content will cause the delivery of that content to overlap with a reminder, a purchased pay-per-view program, a recording, or a period during which programming is blocked by parental control settings, a conflict will arise. In situations such as these, the interactive television application may be used to help resolve the conflict.

The interactive television application may be used to resolve such conflicts by presenting the user with display screens that inform the user of on-screen conflict-resolution options. The user may use these options in deciding how to best resolve a conflict.

A conflict may arise when the user requests delivery of video-on-demand content or video-recorder content (e.g., a video-on-demand movie or a movie stored in the user's personal video recorder or in the user's personal area on a network-based video recorder). The conflict may occur when the requested content has a running time that will cause that content to overlap with a reminder that the user has set. When the interactive television application detects this type of conflict, the application may display a conflict notification and resolution screen such as conflict notification and resolution screen 298 of FIG. 24. Screen 298 stay include information that informs the user of the conflict. Screen 298 may include the title and running time of the video-on-demand program. Information on the title and scheduled broadcast time of the program 299 for which the reminder was set may be included. Screen 298 may also include an indicator such as check-mark indicator 300, which indicates that a reminder for the program 299 has been set.

In the example of FIG. 24, the user sets a reminder for a scheduled airing of the television program Seinfeld at 8:00 (e.g., using a screen such as screen 180 of FIG. 12). The user then attempted to order the playback of the movie "The Majestic" (which may be either video-on-demand or video-recorder content). When requesting the video, the user may have used a video-on-demand order process such as the video-on-demand order process described is connection with FIGS. 7 and 14-17 or a video-recorder playback request process such as the video-recorder playback request process described in connection with FIGS. 7, 20, and 21. These are merely illustrative arrangements for requesting that the interactive television application present video content on the user's equipment 18. Any suitable arrangement may be used if desired.

When the user submits a request to system 10 asking that The Majestic be delivered to the user's equipment (or presented on the user's equipment), the interactive television application uses known information on the running time of the requested video (supplied, for example, by a suitable network-based or local database associated with the network-based or local content storage equipment used to store the video) and uses known information on the time for the reminder (e.g., from a program guide database created using program schedule information from data source 30) to determine whether these two events will overlap. If the events will overlap, the interactive television application may display screen 298.

Screen 298 may include a number of on-screen options from which the user may select to resolve the conflict. The user may, for example, select option 301 if the user desires to continue with the delivery of the requested video content to the exclusion of the reminder. If option 301 is selected, the system 10 will proceed to deliver the video for Majestic to the user. The reminder for Seinfeld will be cancelled.

Option 302 provides with user with an opportunity to continue with the delivery of the requested video and also allows the user to reschedule the reminder for Seinfeld. If the user selects option 302, the interactive television application may provide the user with a display screen that allows the user to reschedule the reminder for Seinfeld to another scheduled airing of the same program (e.g., at the scheduled broadcast time for a repeat showing of the program or at the scheduled broadcast time for another episode of Seinfeld, etc.).

The user may use option 304 to direct the user's local or network-based video recorder to make a recording of Seinfeld (e.g., on user equipment 18 or on network-based equipment in the form of a virtual or real recording). If the user selects option 304, the requested video content is delivered to the user and the interactive television application records Seinfeld at its scheduled broadcast time or otherwise obtains a copy of Seinfeld for the user.

Option 306 may be selected if the user desires to watch the requested video content after Seinfeld is over. The user may select option 306 to defer the video content delivery (or presentation) until Seinfeld has aired, at which time the system 10 may automatically deliver (present) The Majestic to the user.

Option 308 may be selected if the user desires to select another time at which to watch the Majestic. The interactive television program guide may, for example, allow the user to select another day and time at which to watch the requested video. When that new day and time arrives, the interactive television application may automatically (e.g., after a confirmatory prompt) deliver the requested content to the user.

The interactive television application may provide the user with an option such as option 310 that allows the user to cancel the delivery of the Majestic. This allows the user to watch Seinfeld.

Option 311 may be selected if the user would like to begin watching the Majestic, pause for Seinfeld at its scheduled air time, and then resume playback of the Majestic after Seinfeld is over.

It will be understood that the options presented in conflict notification and resolution screen 298, or any other conflict notification and resolution screen discussed here in are illustrative and that some options may be omitted and others added if desired.

A conflict may arise when the requested video (e.g., "The Majestic") overlaps with a recording that the user has scheduled with the interactive television application (e.g., a recording of the program Seinfeld) when the system does not support simultaneous viewing of on-demand content (e.g., video-on-demand movies, pay-per-view-movies, playback of recorded programs, etc.) and recording of broadcast content. The interactive television application may use information on the running time of the requested video and information on the scheduled time of the recording to determine whether there is an overlap between these two events. When a conflict is detected, the interactive television application may present a screen for the user such as display screen 312 of FIG. 25.

Figure 25:
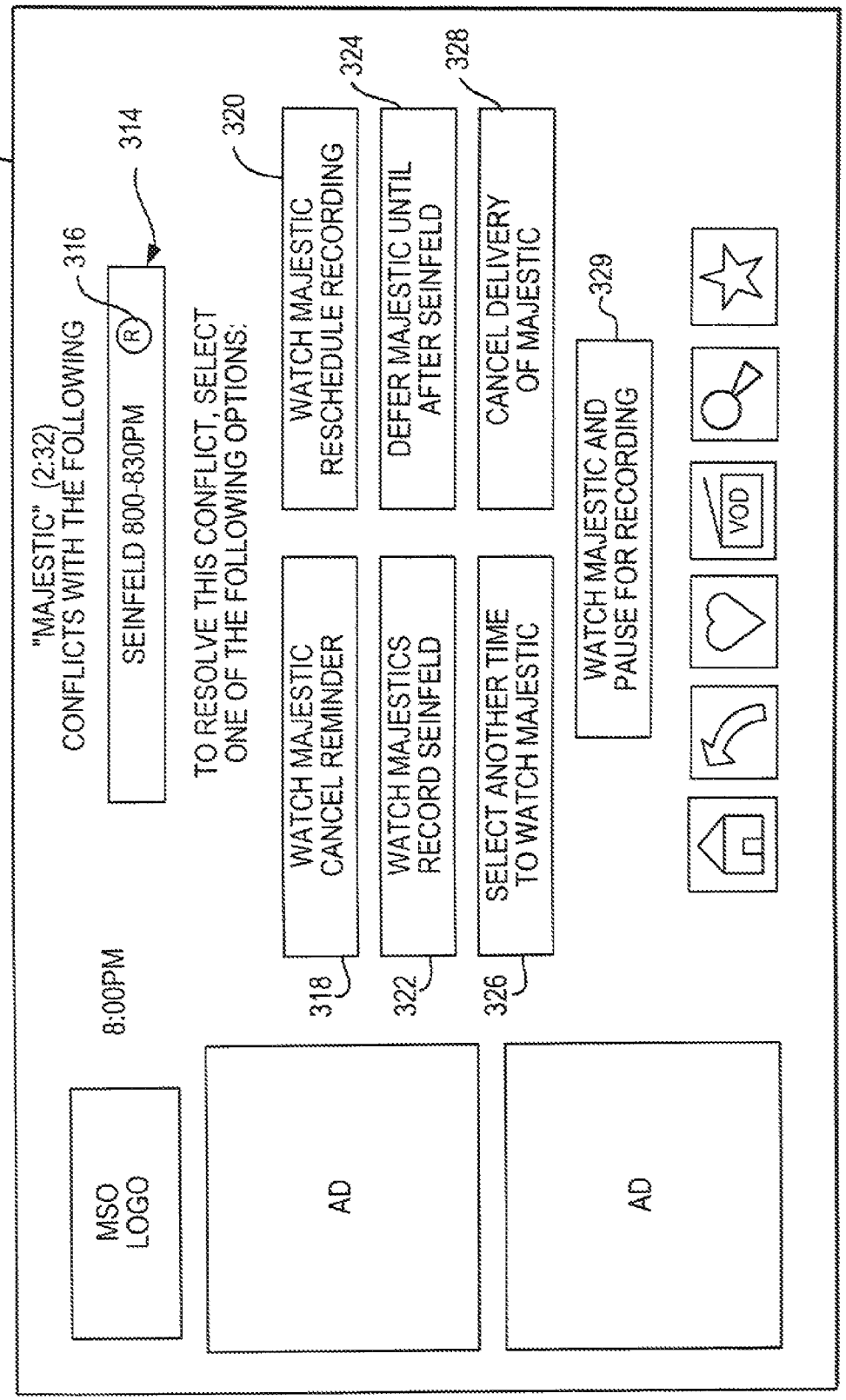

As shown in FIG. 25, screen 312 may include information such as the title and duration of the requested video content and the title and time 314 of the scheduled recording. Program listings information for the program for which the recording is scheduled may be annotated with an icon such as recording icon 316 that indicates that the displayed program title is one for which a recording has been set.

Display 312 may include a number of on-screen options. The user may select an appropriate option to instruct the interactive television application on how to resolve the conflict between the requested video and the recording that the user has set.

If the user selects option 318, the interactive television application will proceed to provide the requested video (e.g., the Majestic) to the user and will cancel the recording (e.g., the recording for Seinfeld will be cancelled).

If the user selects option 320, the interactive television application will deliver The Majestic and will provide the user with on-screen options or other suitable opportunities to reschedule the recording of Seinfeld. For example, the interactive television application may provide the user with an opportunity to schedule the recording of Seinfeld for when Seinfeld is being shown as a repeat.

If the user selects option 322, the interactive television application will present The Majestic to the user and will record Seinfeld using the network-based or local video recorder functions of system 10.

The user may select option 324 to defer the delivery of The Majestic until after Seinfeld has been recorded.

When the user selects option 326, the interactive television application may provide the user with one or more screens of options that allow the user to select another time for viewing the Majestic.

Selecting option 328 directs the interactive television application to cancel delivery of The Majestic. The recording of Seinfeld will therefore no longer give rise to a conflict and can proceed as scheduled.

If desired, option 329 by may be selected to direct the system to deliver the Majestic to the user until the beginning of the recording of Seinfeld, pause the Majestic for the duration of the recording, and then resume the delivery of the Majestic when recording is complete.

Conflicts can arise when a requested video will overlap with a time-based parental control setting. For example, the user may have blocked the viewing of all programming between 3:00 and 5:00. If the user requests delivery of video content that -will overlap with this time period, the interactive television application may display a screen such as conflicts notification and resolution screen 330 of FIG. 26.

Screen 330 may include the title of the video-on-demand program and its duration and information 332 on the particular parental control setting that has given rise to the conflict. Screen 330 may also contain options that allow the user to instruct the interactive television application on how to address the conflict. The user may select option 334 if the user desires to watch the requested video and override the existing parental control settings. With this approach, the user may be required to supply the interactive television application with a valid personal identification number (e.g., the parent's PIN) to unlock the blocked time period.

Figure 26:
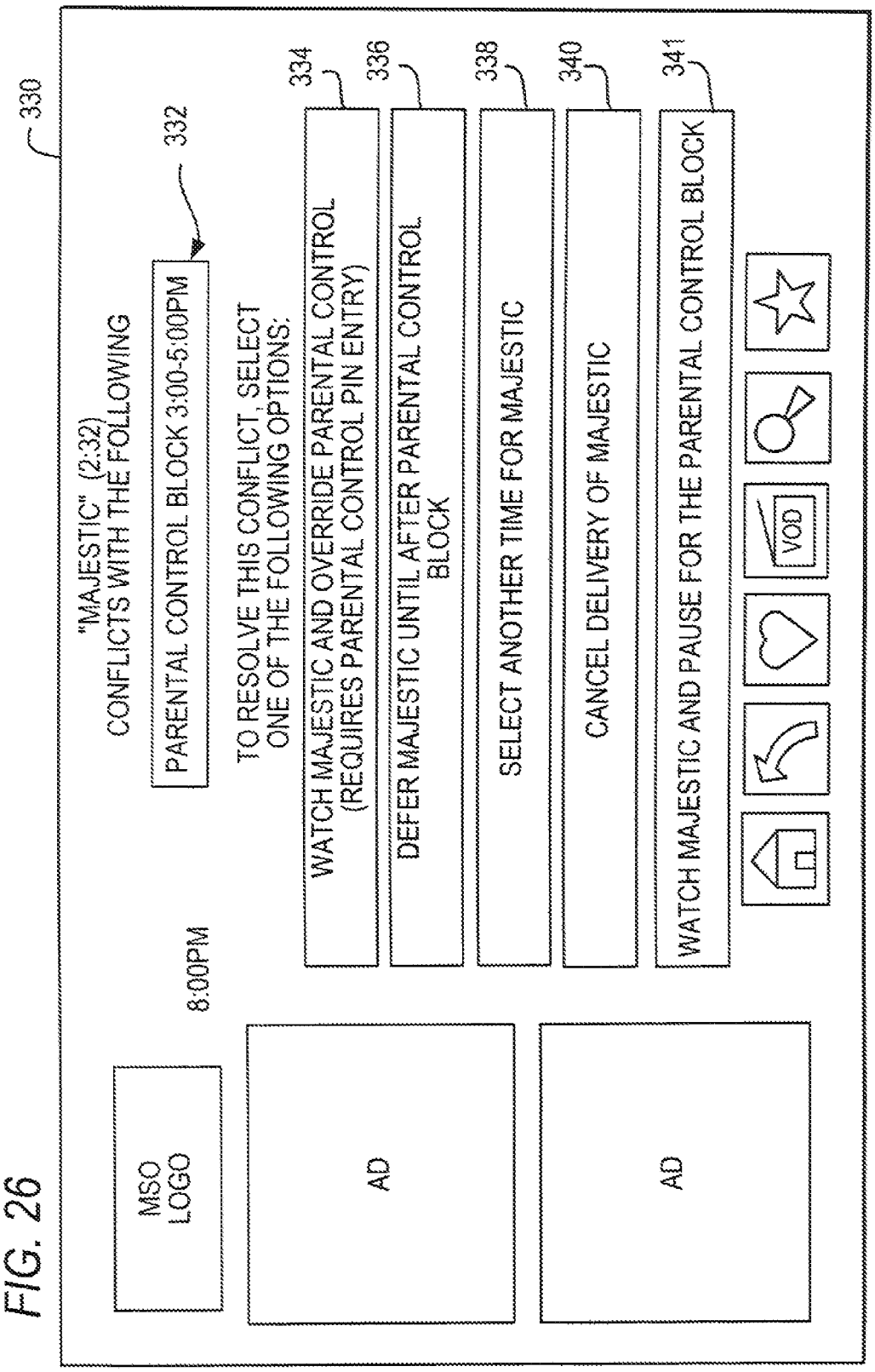

The user may select option 336 if the user desires to defer delivery of The Majestic until after the period of time covered by the conflicting parental control setting has passed. In the example of FIG. 26, a parental control setting that blocks all programming from being viewed between 3:00 and 5:00 has been established. If the user selects option 336, the interactive television application may defer presentation of The Majestic until 5:00 PM, which is the time at which the parental control expires.

Option 338 may be used to select another time for delivery of the Majestic. The user may select option 340 to cancel delivery of the requested video. The user may select option 341 to begin the Majestic, to pause for the duration of the parental control block, and to resume delivery of the Majestic after the parental control block.

Figure 27:
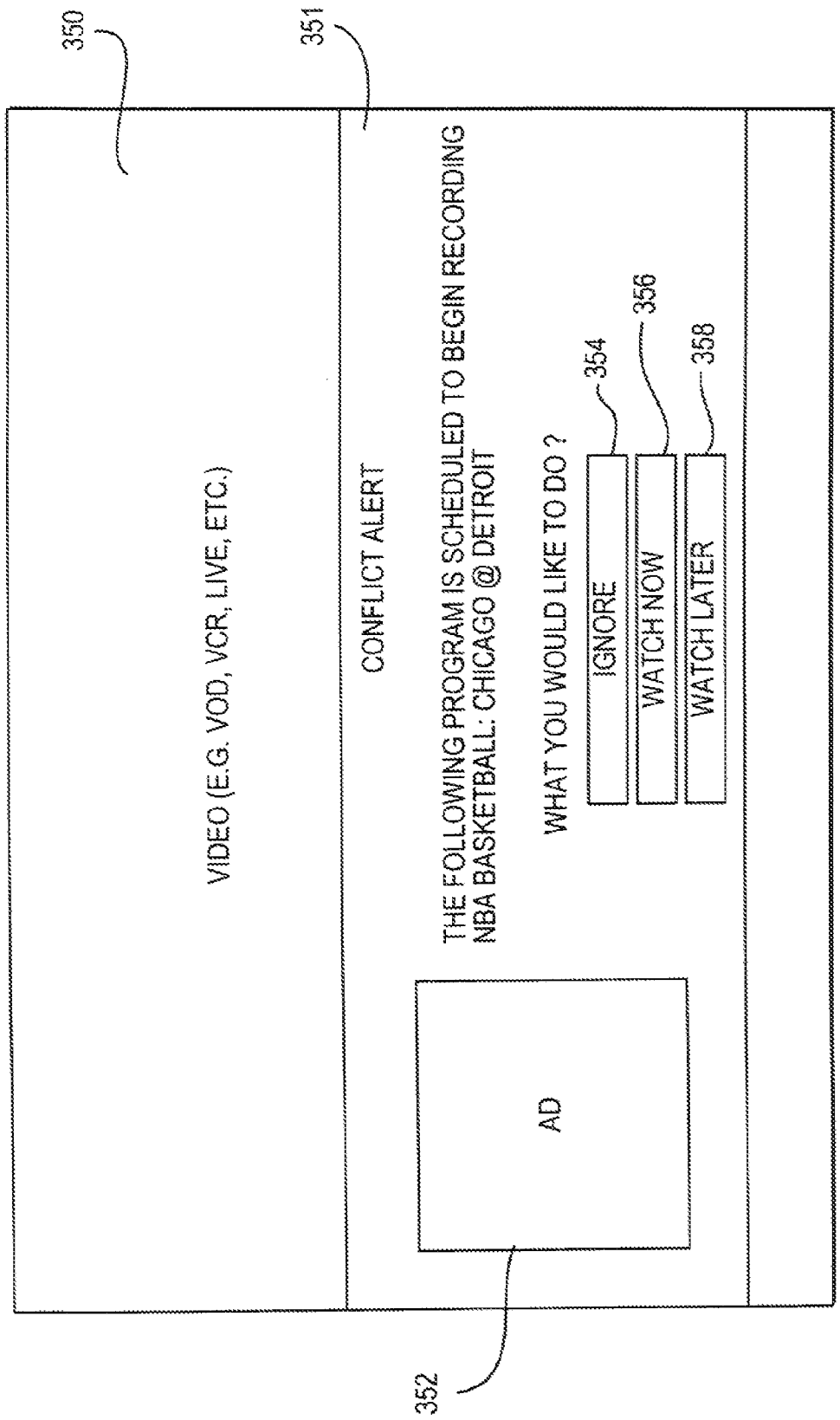

Conflict notification and resolution screens may also be provided as video overlays, alerts, or reminders. These types of notification may be particularly useful in resolving conflicts as they occur rather than in advance of the conflict. For example, as shown in FIG. 27, a screen 350 may foe provided that includes a video for on-demand content (e.g., a video-on demand-movie, a recorded movie, a pay-per-view movie, a broadcast program that has been paused or rewound so that it is no longer being viewed in real-time, etc.). A user may have requested the on-demand video content and subsequently paused or rewound the video, prolonging the time it will take the video to complete. Although a conflict may not have been apparent at the time the video was requested, because the video's time has prolonged due to pausing, rewinding, etc., there may now exist a potential conflict with the requested video and a program previously scheduled to be recorded, a reminder, an ordered pay-per-view, or a parental control.

In response to such a conflict, the recording application may automatically begin, buffering the program scheduled for recording, reminder, or purchase, and when the requested video is complete, the user may be notified of the presence of the buffered recording. Alternatively, as the start time for the conflicting scheduled program approaches, the interactive television application may provide the user with a conflict alert video overlay, such as conflict alert video overlay 351 of FIG. 27. Conflict alert video overlay 351 may include one or more selectable advertisements 352 as well, as a number of on-screen options for resolving the conflict. The user may select an appropriate option to instruct the interactive television application on how to resolve the conflict between the video being displayed and the recording or other time-based setting that the user has set.

If the user selects option 354, the interactive television application may ignore the conflict and continue to provide the selected video being displayed to the user and may cancel the recording, reminder, or purchase (e.g., the recording for NBA Basketball will be cancelled). If the time based setting is a parental control time block, the user may be requested to enter a pin to continue watching.

If the user selects option 356, the interactive television application will stop providing the requested video being displayed and tune to the scheduled broadcast of NBA basketball. If the user selects option 358, the interactive television application may start to buffer the scheduled program while the requested video finishes. Once the requested video is complete, the use may be provided with an opportunity to view the program being recorded in its entirety.

Figure 28:
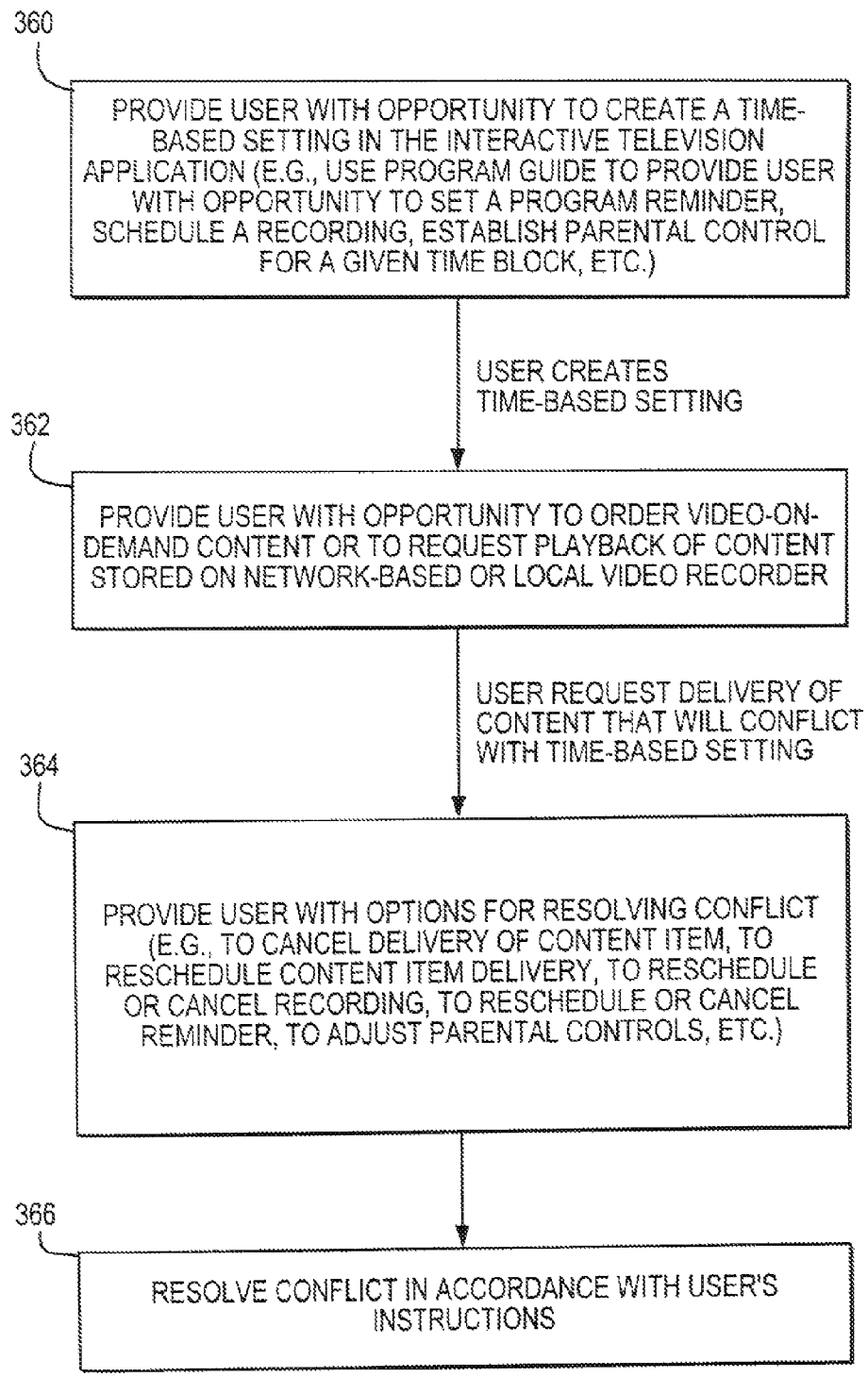
FIG. 28 is a flow chart of illustrative steps involved in using an interactive television system to allow a user to create time-based settings and request video content delivery and to resolve conflicts between the settings and content delivery requests in accordance with the present invention.

A flow chart of illustrative steps involved in resolving conflicts that arise when a user requests delivery of video that conflicts with time-based settings such as reminders, recordings, pay-per-view purchases, and parental controls is shown in FIG. 28. At step 360, the interactive television application may provide the user with on-screen options and other suitable opportunities to create a time-based setting. For example, an interactive television program guide may be used to provide the user with an opportunity to establish a reminder for a program, to purchase a pay-per-view program, to set a recording of a program, or to establish parental controls that lock all channels or certain channels at particular times (e.g., during a given period of time or for the duration of a program, etc.).

After the user has used the interactive television application to create one or more of these settings, the user may be provided with an opportunity to request video content at step 362. For example, the interactive television application may provide the user with an opportunity to request that video-on-demand content be delivered from the network. The user may also be provided with an opportunity to request that local or network-based video recorder content be played back for the user.

When the user requests that video content be presented to the user on the user equipment 18, the interactive television application may, at step 364, provide the user with opportunities to resolve conflicts that arise. For example, the interactive television application can use information on the expected running time of the video-on-demand or video recorder content and can use this information to determine whether the requested video will overlap with a scheduled program reminder, a scheduled and pre-ordered pay-per-view program, a scheduled program recording, or the time period during which a parental control setting is in effect. The interactive television application may display conflict notification and resolution screens on the user's equipment.

The conflict notification and resolution screens that are displayed for the user may include conflict resolution options that the user may select. The user may, for example, cancel a reminder, ordered pay-per-view program, or scheduled recording, or may override an existing parental control setting by providing an appropriate parental control PIN. The user may opt to defer or reschedule delivery of the requested video to avoid the conflict, or the user may cancel video delivery. The interactive television application may resolve the conflict in accordance with the user's instructions at step 366.

The foregoing is merely illustrative of the principles of this invention and various modifications can be made by those skilled in the art without departing from the scope and spirit of the invention.

What is claimed is:

1. A method for using an interactive application that is implemented using user equipment, comprising:
   receiving a user input creating a time-based setting associated with a program in the interactive application, wherein a first time is associated with the time-based setting;
   receiving a user request to access media content;
   determining an expected running time of the requested media content, wherein the expected running time of the requested media content results from a user action prolonging playback of the media content;
   determining, based on the expected running time, whether there is a conflict between the requested media content and the time-based setting at the first time, wherein the conflict arises when the expected running time of the requested media content overlaps with the time-based setting; and
   in response to determining that the conflict exists, selecting a second time to associate with the time-based setting.

2. The method of claim 1, wherein when the time-based setting is a parental control setting, the first time is a first duration of the parental control setting, and selecting the second time comprises selecting a second duration of the parental control setting.

3. The method of claim 1, wherein the first time is a starting time of the program associated with the time-based setting.

4. The method of claim 1, wherein the time-based setting includes a reminder for the program or a scheduled recording of the program.

5. The method of claim 1 further comprising:
   determining an overlapping portion of the time-based setting with the media content, wherein the overlapping portion is based on the first time associated with the time based setting preceding the expected running time of the media content; and in response to determining the overlapping portion, automatically buffering the overlapping portion.

6. The method of claim 1, wherein the user action prolonging the playback comprises pausing or rewinding the requested media content.

7. The method of claim 1, further comprising generating for display a notification that notifies the user of the conflict.

8. The method of claim 7, wherein the notification comprises a plurality of options to resolve the conflict.

9. The method of claim 8, wherein the time-based setting is a parental control setting and at least one of the plurality of options to resolve the conflict is to override the parental control setting.

10. The method of claim 8, wherein the time based setting is a reminder setting and at least one of the plurality of options to resolve the conflict is to record the program associated with the reminder setting.

11. A system for using an interactive application that is implemented using user equipment, the system comprising:
a control circuitry configured to:
receive a user input creating a time-based setting associated with a program in the interactive application, wherein a first time is associated with the time-based setting;
receive a user request to access media content;
determine an expected running time of the requested media content, wherein the expected running time of the requested media content results from a user action prolonging playback of the media content;
determine, based on the expected running time, whether there is a conflict between the requested media content and the time-based setting at the first time, wherein the conflict arises when the expected running time of the requested media content overlaps with the time-based setting; and select, in response to determining that the conflict exists, a second time to associate with the time-based setting.

12. The system of claim 11, when the time-based setting is a parental control setting, the first time is a first duration of the parental control setting, and selecting the second time comprises selecting a second duration of the parental control setting.

13. The system of claim 11, wherein the first time is a starting time of the program associated with the time-based setting.

14. The system of claim 11, wherein the time-based setting includes a reminder for the program or a scheduled recording of the program.

15. The system of claim 11, wherein the control circuitry is further configured to:
determine an overlapping portion of the time-based setting with the media content, wherein the overlapping portion is based on the first time associated with the time based setting preceding the expected running time of the media content; and
automatically buffer the overlapping portion in response to determining the overlapping portion.

16. The system of claim 11, wherein the user action prolonging the playback comprises pausing or rewinding the requested media content.

17. The system of claim 11, wherein the control circuitry is further configured to generate for display a notification that notifies the user of the conflict.

18. The system of claim 17, wherein the notification comprises a plurality of options to resolve the conflict.

19. The system of claim 18, wherein the time-based setting is a parental control setting and at least one of the plurality of options to resolve the conflict is to override the parental control setting.

20. The system of claim 18, wherein the time based setting is a reminder setting and at least one of the plurality of options to resolve the conflict is to record the program associated with the reminder setting.

* * * * *